(12) United States Patent
McCall et al.

(10) Patent No.: US 6,311,555 B1
(45) Date of Patent: Nov. 6, 2001

(54) ANGULAR RATE PRODUCER WITH MICROELECTROMECHANICAL SYSTEM TECHNOLOGY

(75) Inventors: Hiram McCall; Ching-Fang Lin, both of Chatsworth, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 09/442,596

(22) Filed: Nov. 17, 1999

(51) Int. Cl.$^7$ .............................. G01P 15/00; G05B 15/00
(52) U.S. Cl. ................................... 73/488; 700/1
(58) Field of Search ................................ 73/488, 504.02, 73/504.12, 504.16; 700/1, 73, 302, 303, 304; 701/1

(56) References Cited

U.S. PATENT DOCUMENTS

| | | | |
|---|---|---|---|
| 4,597,667 | * | 7/1986 | Curry et al. ........................ 356/476 |
| 4,740,084 | * | 4/1988 | Curry et al. ........................ 356/476 |
| 5,444,639 | * | 8/1995 | White ................................ 708/300 |

* cited by examiner

Primary Examiner—Richard A. Moller
(74) Attorney, Agent, or Firm—Raymond Y. Chan; David and Raymond Patent Group

(57) ABSTRACT

An angular rate producer is provided for measuring vehicle angular rate, wherein high performance dither drive signal generation and angular sensing signal extracting means are provided for hands-on vibrating type angular rate detecting units, including tuning forks and vibrating strings to obtain highly accurate angular rate signals. The angular rate producer includes an vibrating type angular rate detecting unit for detecting angular rate via Corilois Effect; an interfacing circuitry for converting angular motion-induced signals from the vibrating type angular rate detecting unit into angular rate signals and converting inertial element dither motion signals from the vibrating type angular rate detecting unit into processible inertial element dither motion signals; and a digital processing system for locking the high-quality factor frequency and amplitude of the vibrating inertial elements in the vibrating type angular rate detecting unit by means of providing an electronic energy including dither drive signal for the vibrating type angular rate detecting unit using the processible inertial element dither motion signals.

69 Claims, 10 Drawing Sheets

ANGULAR RATE PRODUCER WITH MICROELECTROMECHANICAL SYSTEM TECHNOLOGY

BACKGROUND OF THE PRESENT INVENTION

1. Field of the Present Invention

The present invention relates to an angular rate producer, and more particularly to an angular rate producer with microelectromechanical system (MEMS) technology to measure vehicle angular rate. The angular rate producer of the present invention comprises an vibrating type angular rate detecting unit, an interfacing circuitry, and a digital processing system to obtain more highly accurate, sensitive, stable vehicle angular rate measurements under dynamic environments.

2. Description of Related Arts

Generally, an angular rate producer can function as an angular rate sensor or a gyro. It can obtain vehicle angular rate measurements to employ a conventional gyro in the vehicle. Many types of approaches based on various sensing principles used to achieve an angular rate sensor have been invented in the past decades, are currently being invented, and will continue to be invented as commercial markets for angular rate sensors continue to expand.

Existing angular rate sensors or gyros include spinning iron wheel gyros and optical gyros.

Conventional spinning iron wheel gyros are principally based on the Gyroscopic Law. The spinning iron wheel gyros generally have a spinning wheel and analog output, high cost, were heavy, consumed a lot of power because they had moving mechanical parts, and wore out after just a few thousand hours of operation.

Existing optical gyros, including ring laser gyros and interferometric fiber-optic gyros, are dependant on the Sagnac Effect. The optical gyros generally have digital output and moderate cost.

Truly low-cost, highly producible, miniaturized size, and low power angular rate sensors with extended life have been a goal of the industry for many years. Conventional angular rate sensors have been commonly used in wide variety of applications. However, their cost, size, and power prohibit them from the emerging commercial applications, including phased array antennas.

Rapid advance in MEMS technologies makes it possible to fabricate a low cost, light weight, miniaturized size, and low power angular rate sensors. "MEMS" stands for "Micro-ElectroMechanical Systems", or small integrated electrical/mechanical devices. MEMS devices involve creating controllable mechanical and movable structures using IC (Integrated Circuit) technologies. MEMS includes the concepts of integration of Microelectronics and Micromachining. Examples of successful MEMS devices include inkjet-printer cartridges, accelerometers that deploy car airbags, and miniature robots.

Microelectronics, the development of electronic circuitry on silicon chips, is a very well developed and sophisticated technology. Micromachining utilizes process technology developed by the integrated circuit industry to fabricate tiny sensors and actuators on silicon chips. In addition to shrinking the sensor size by several orders of magnitude, integrated electronics can be placed on the same chip, creating an entire system on a chip. This instrument will result in, not only a revolution in conventional military and commercial products, but also new commercial applications that could not have existed without small, inexpensive inertial sensors.

Some MEMS angular rate sensor approaches have been developed to meet the need for inexpensive yet reliable angular rate sensors in fields ranging from automotive to consumer electronics, based the concept of using a vibrating element to sense angular rate under the Coriolis principle. For example, single input axis MEMS angular rate sensors are usually based on either translational resonance, including tuning forks, or structural mode resonance, including vibrating rings and associated microelectronic supporting circuitry. Moreover, dual input axis MEMS angular rate sensors may be based on angular resonance of a rotating rigid rotor suspended by torsional springs. The inherent symmetry of the circular configuration allows angular rate measurement about two axes simultaneously.

Unfortunately, there is not a high performance commercial MEMS angular rate sensors available, which can compete with the measurement accuracy of conventional iron gyros and optical gyros. It is still much more of a challenging to design and manufacture a MEMS angular rate sensor with sufficient accuracy, keen sensitivity, wide dynamic range, and high stability.

SUMMARY OF THE PRESENT INVENTION

A main objective of the present invention is to provide an angular rate producer employed with microelectromechanical system (MEMS) technology for measuring vehicle angular rate by obtaining highly accurate angular rate signals. The high accuracy is obtained by maximizing the device's momentum quality, or in other words, selecting the momentum with the best combination of stability and magnitude. The best momentum quality is obtained through high performance dither drive signal generation and angular sensing signal extracting means for hands-on vibrating type angular rate detecting units, including tuning forks and vibrating strings.

Another objective of the present invention is to provide an angular rate producer with microelectromechanical system (MEMS) technology for measuring vehicle angular rate, which comprises:

a digital processing system for outputting dither drive energy which is a kind of continuous or periodical electrical signal, such as voltage, with predetermined frequency and amplitude;

an angular rate detecting unit for receiving the dither drive energy to maintain a constant momentum of an oscillation of the inertial element and producing an angular motion-induced signals with a stable scale factor with respect to the vehicle angular rate and inertial element dither motion signals; and an interface means for transforming the angular motion-induced signals received from the angular rate detecting unit into angular rate signals adapted to be used and read by an inertial measurement unit, outputting the angular rate signals, and converting the inertial element dither motion signals to digital element displacement signals with predetermined phase which are inputted into the digital processing system for producing said dither driving energy.

Another objective of the present invention is to provide an angular rate producer employed with microelectromechanical system (MEMS) technology for measuring vehicle angular rate, wherein the number of resonance modes of the inertial elements of the vibrating type angular rate detecting unit can be minimized by integrating the interfacing circuitry and the digital processing system.

Another objective of the present invention is to provide an angular rate producer employed with microelectromechanical system (MEMS) technology for measuring vehicle angular rate, wherein the interfacing circuitry and the digital processing system are integrated to achieve resonance mode linearity of the inertial elements of the vibrating type angular rate detecting unit.

Another objective of the present invention is to provide an angular rate producer employed with microelectromechanical system (MEMS) technology for measuring vehicle angular rate, wherein the resonance modes of the inertial elements of the vibrating type angular rate detecting unit is locked to increase the sensitivity of the angular rate producer.

Another objective of the present invention is to provide an angular rate producer employed with microelectromechanical system (MEMS) technology for measuring vehicle angular rate, wherein the angular rate bias and angular rate scale factor shift of the angular rate producer is minimized.

Another objective of the present invention is to provide an angular rate producer employed with microelectromechanical system (MEMS) technology for measuring vehicle angular rate, wherein a closed loop process for producer scale factor linearity can be provided.

Another objective of the present invention is to provide an angular rate producer employed with microelectromechanical system (MEMS) technology for measuring vehicle angular rate, wherein the interfacing circuitry and the digital processing system are integrated to achieve displacement regulation of the inertial elements of the vibrating type angular rate detecting unit for angular rate producer scale factor stability, and temperature stabilization for producer angular rate scale factor and angular rate bias stability.

DETAILED DESCRIPTION OF THE PREFERRED EMBODIMENT

Figure 1:
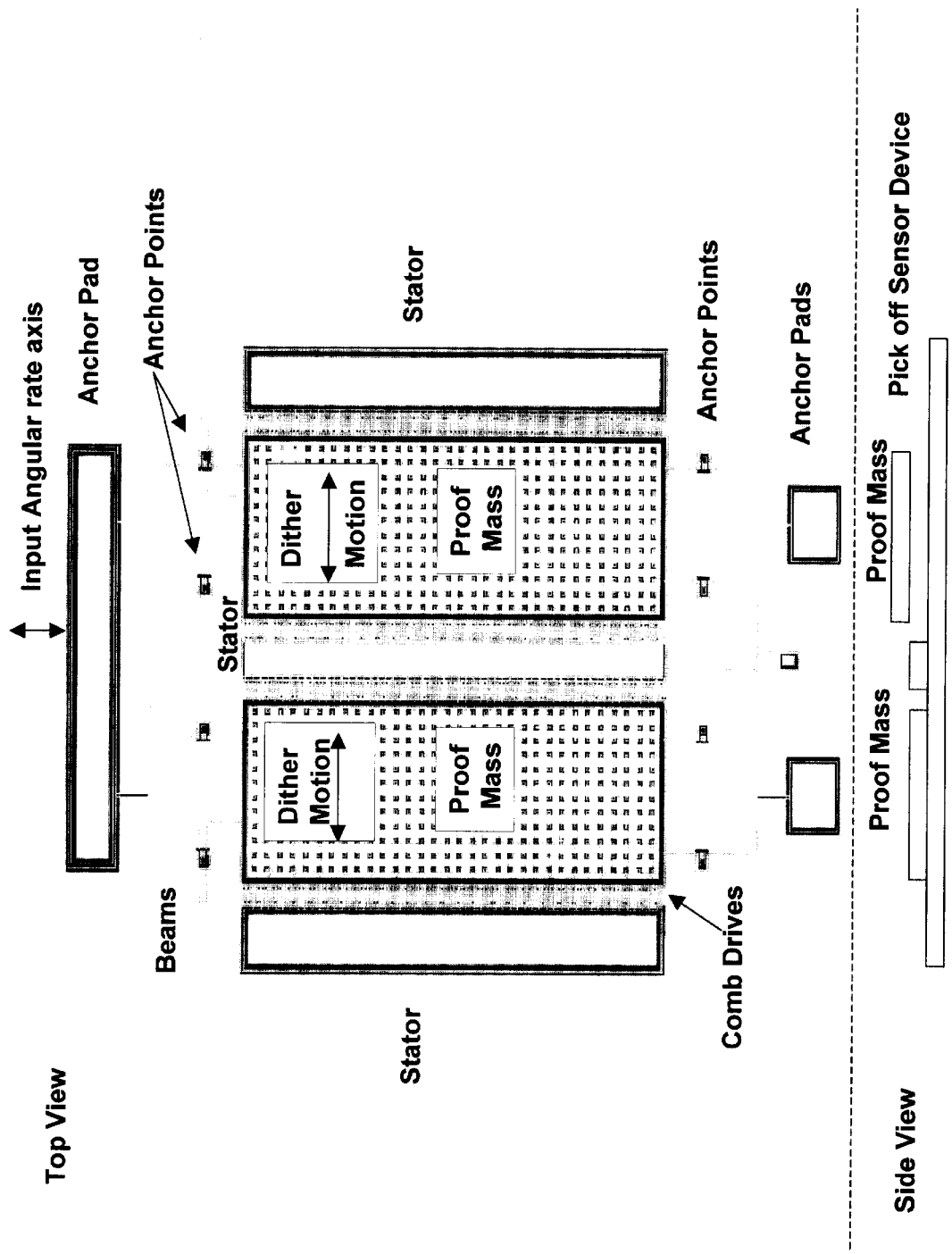
FIG. 1 is a schematic view illustrating the configuration of a conventional micromachined sensor unit adapted to be used as a vibrating type angular rate detecting unit.

Referring to the drawings, a preferred embodiment of the present invention provides to an angular rate producer employed with microelectromechanical system (MEMS) technologies for measuring vehicle angular rate.

The angular rate producer of the present invention uses vibrating inertial elements to sense vehicle angular rate via the Coriolis Effect. The angular rate sensing principle of Coriolis Effect is tie inspiration behind the practical vibrating angular rate sensors.

The Coriolis Effect can be explained by saying that when an angular rate is applied to a translating or vibrating inertial element, a Coriolis force is generated. When this angular rate is applied to the axis of an oscillating inertial element, its tines receive a Coriolis force, which then produce torsional forces about the sensor axis. These forces are proportional to the applied angular rate, which then can be measured.

The force (or acceleration), Coriolis force (or Coriolis acceleration) or Coriolis effect, is originally named from a French physicist and mathematician, Gaspard de Coriolis (1792–1843), who postulated his acceleration in 1835 as a correction for the earth's rotation in ballistic trajectory calculations. The Coriolis acceleration acts on a body that is moving around a point with a fixed angular velocity and moving radially as well.

The basic equation defining Coriolis force can be expressed as follows:

$$\vec{F}_{Coriolis} = m\,\vec{a}_{Coriolis} = 2m(\vec{\omega} \times \vec{V}_{Oscillation})$$

where $\vec{F}_{Coriolis}$ is the detected Coriolis force;

$m$ is the mass of the inertial element;

$\vec{a}_{Coriolis}$ is the generated Coriolis acceleration;

$\vec{\omega}$ is the applied (input) angular rotation rate;

$\vec{V}_{Oscillation}$ is the oscillation velocity in a rotating frame.

The Coriolis force produced is proportional to the product of the mass of the inertial element, the input rotation rate, and oscillation velocity of the inertial element that is perpendicular to the input rotation rate.

Vibrating type angular rate detecting units using the Coriolis effect can be designed and fabricated in different configurations. An emerging advancement in fabricating a device used as a vibrating type Coriolis Effect angular rate detecting unit is to fabricate a micromachined unit functioning as a vibrating type angular rate detecting unit on a chip using MicroelectronicMechanicalSystem technologies. The typical available approaches, products, and patents that can be used as vibrating type angular rate detecting units are also diverse, including:

(A) Approaches:

Vibrating string;

Tuning fork;

Closed loop restore Quartz and silicon gyros;

Vibration angular and rotation Quartz and silicon gyros;

Bulk machined gyros;

Multi capacitive pickoff for detecting quartz resonance circular mode vibrations.

(B) Products:

Systron Donner Quartz Rate Sensor(QRS);

Delco's Hemispherical Resonator gyro (HRG);

(C) U.S. Pat. Nos. and Titles:
1) U.S. Pat. No. 5,796,001, Monolithic micromechanical tuning fork angular rate sensor
2) U.S. Pat. No. 5,767,405, Comb-drive micromechanical tuning fork gyroscope with piezoelectric readout
3) U.S. Pat. No. 5,747,961, Beat frequency motor position detection scheme for tuning fork gyroscope and other sensors
4) U.S. Pat. No. 5,635,639, Micromechanical tuning fork angular rate sensor
5) U.S. Pat. No. 5,505,084, Micromechanical tuning fork angular rate sensor
6) U.S. Pat. No. 5,496,436, Comb drive micromechanical tuning fork gyro fabrication method
7) U.S. Pat. No. 5,492,596, Method of making a micromechanical silicon-on-glass tuning fork gyroscope
8) U.S. Pat. No. 5,388,458, Quartz resonant gyroscope or quartz resonant tuning fork gyroscope
9) U.S. Pat. No. 5,349,855, Comb drive micromechanical tuning fork gyro
10) U.S. Pat. No. 5,952,574, Trenches to reduce charging effects and to control out-of-plane sensitivities in tuning fork gyroscopes and other sensors
11) U.S. Pat. No. 5,911,156, Split electrode to minimize charge transients, motor amplitude mismatch errors, and sensitivity to vertical translation in tuning fork gyros and other devices
12) U.S. Pat. No. 5,892,153, Guard bands which control out-of-plane sensitivities in tuning fork gyroscopes and other sensors In the present invention, the preferred vibrating type angular rate detecting unit is a MEMS device, but not limited to MEMS device obviously, because the MEMS technologies dramatically shrink the size of a vibrating type angular rate detecting unit to the microscopic level.

For instance, a configuration of such a Micromachined Sensor Unit that can function as a vibrating type angular rate detecting unit is shown in FIG. 1. In this configuration, the vibrating type angular rate detecting unit detects angular rate by picking-off a signal generated by an oscillating micromachined mass as it deviates from its plane of oscillation under the Coriolis force effect when the oscillating micromachined mass is submitted to a rotation about an axis perpendicular to the plane of oscillation.

Such micromachined sensor unit consists of two vibration devices which have opposite dither motion directions. Thus, a pair of differential measurements are formed to eliminate the effect of the gravity and acceleration induced interference force. The inertial elements are suspended by eight beams which also provide the plastic force for the vibration at the same time. The beams are attached to the substrate by anchors on the middle of the beams.

Two vibrating inertial elements are attached by springs to each other and to the surrounding stationary material. The vibrating (dither) inertial elements are driven in opposite directions by electrostatic comb drive motors to maintain lateral in-plane oscillation. The dither motion is in the plane of the wafer. When an angular rate is applied to the MEMS device about the input axis (which is in the plane of the tines), the inertial elements are caused to oscillate out of plane by a Coriolis force due to Coriolis effect. The resulting out-of-plane oscillation motion amplitude, proportional to the input angular rate, is detected and measured by capacitive pickoff plates underneath the inertial elements. The comb drives move the elements out of phase with respect to each other. The elements will then respond in opposite directions to the Coriolis force.

The circuitry detects this perpendicular motion by measuring the change in capacitance. The sensitivity and stability of the device is dependent on the amplitude of the dither motion, the frequency of the oscillation, the mass of the device and the detection method. The sensitivity is proportional to the product of the velocity of the device and the angular rate. Maximizing the amplitude and frequency of oscillation increases the sensitivity. To increase the amplitude of oscillation, the device is run at the resonant frequency of the supporting springs, which also minimizes the energy required to drive the device. Typical resonant frequencies are 1000–13,000 Hz.

The change in capacitance caused by the motion of the elements in response to a Coriolis force is determined by measuring the current flow from a high frequency signal (100 kHz to 1 MHz). The capacitance is on the order of 0.5 pf with changes in capacitance on the order of 1 ff. In order to achieve the greatest sensitivity, the design of the configuration places the electronics as close as possible to the pickoff electrodes on the device. This is done by either integrating the electronics on the same wafer as the micromachined sensor unit or by placing the electronics as close as possible to the sensor package. On chip electronics can detect changes in motion on the order of angstroms.

When an angular rate is applied about the angular rate input axis of the micromachined sensor unit, the changed-capacitive signal can be picked up.

Figure 2:
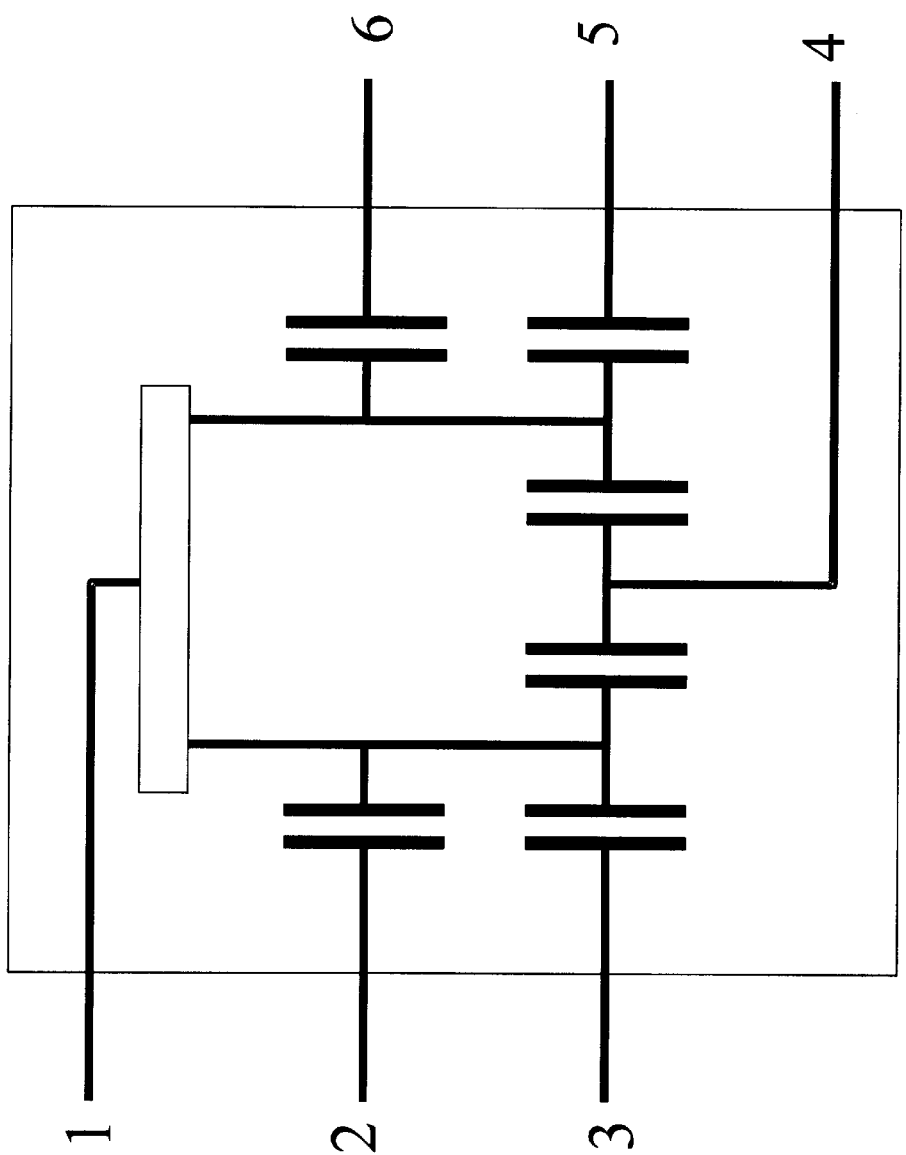
FIG. 2 is a schematic view shows variable capacitive signal picking off point connections for the micromachined sensor unit.

FIG. 2 shows the capacitive pickoff configuration. Totally, six capacitors are formed by the micromachined sensor unit structure. Among them, four capacitors are formed by the two inertial elements and three stators to construct four pairs of drive combs for the vibration drive mechanism. Two capacitors are formed by two pairs of inertial elements and sensor electrodes. When there is an angular rate in the gyro input axis, one inertial element will move towards its electrode and the other moves away from its electrode under the Coriolis force. Thus the two sensor capacitors can be used to form a differential measurement circuit.

Two techniques are presently employed to fabricate such a MEMS device, bulk micromachining and surface micromachining. The preferred MEMS fabrication of such a device is the surface micromachining process. Surface micromachined devices are typically a few microns to 10 microns thick. Angular rate sensors created with surface machining have very low masses. The advantage of surface machining is the low cost and the ease of incorporating the electronics close to the sensor.

In surface micromachining, the inertial element is built onto the surface of a silicon wafer. To build a surface micromachined sensor, a few $\mu$m thick layer of sacrificial oxide is deposited on the passivation layer of a silicon wafer, in which n$^+$ wells have been previously diffused. Openings are then etched through both insulators to the diffused areas in the substrate. A thick layer of polysilicon is subsequently deposited over the entire sensor area, filling the openings and establishing both a mechanical and electrical bond with the n$^+$ diffused areas. The inertial elements are then etched into the layer of "floating" polysilicon. The sacrificial oxide is subsequently removed from under the polysilicon through further etching, leaving the polysilicon layer essentially suspended in mid-air, yet still attached to the substrate via the anchor posts, or pedestals, formed at the points of diffusion.

The most commonly used surface micromachining processes starts with silicon wafers of the same grade and type used in microelectronics fabrication and uses layers of silicon dioxide as the sacrificial material and layers of polysilicon, a deposited, less crystalline form of silicon, as the structural material. Other deposited materials including silicon nitride, polyimides, and aluminum are also used to provide electrically insulating materials, conducting materials, etchant masks, and additional structural materials. All of these materials are extensively used and available in standard microelectronics fabrication.

Because of the laminated structural and sacrificial material layers and the etching of material done by a process that is insensitive to crystalline structure, either because of the etch or because the material itself is non-crystalline, surface micromachining enables the fabrication of free form, complex, and multi-component integrated MEMS structures, liberating the MEMS designer to envision and build devices and systems that are impossible to realize with bulk process. Surface micromachining also frees the process developer and device designer to choose any material system that has complementary structural and sacrificial materials. It is this freedom to fabricate devices and systems without constraints on materials, geometry, assembly and interconnections that is the source for the richness and depth of MEMS applications that cut across so many areas.

All actuation is done with electrostatic forces. These forces are very weak so many obstacles can impede the motion of the inertial elements. Problems can occur from dust or from the device not being properly cleaned. The surface machined device is made by separating all moving parts with a sacrificial oxide. The final step in the processing is the removal of this oxide. Once the oxide is removed the etching solution has to be completely removed with water and then the water has to be removed with alcohol. The alcohol then has to be removed completely by drying the device. If the solutions are not removed by the correct process stiction occurs impeding the motion of the device making it unusable. The device can also be susceptible to the squeeze-film effect. If the device is run in atmosphere the movement of the device can be impeded by the inability of the trapped gas to move when the device moves. Many of these devices are packaged in a vacuum environment. Getters are usually employed in the package to maintain the quality of the vacuum, although the use of a vacuum can degrade the device's resistance to shock. Air damping increases shock resistance.

The major problems with micromachined vibrating type angular rate sensors are insufficient accuracy, sensitivity, and stability. Unlike MEMS accelerometers that are passive devices, micromachined vibrating type angular rate sensors are active devices. Therefore, associated high performance electronics and control should be invented to effectively use hands-on micromachined vibrating type angular rate sensors to achieve high performance angular rate measurement in order to meet the requirement of being employed in micro IMU.

Therefore, in order to obtain angular rate sensing signals from a vibrating type angular rate detecting unit, a dither drive signal or energy must be fed first to the vibrating type angular rate detecting unit to drive and maintain the oscillation of the inertial elements with a constant momentum. The performance of the dither drive signals are critical for the whole performance of a MEMS angular rate sensor.

Figure 3:
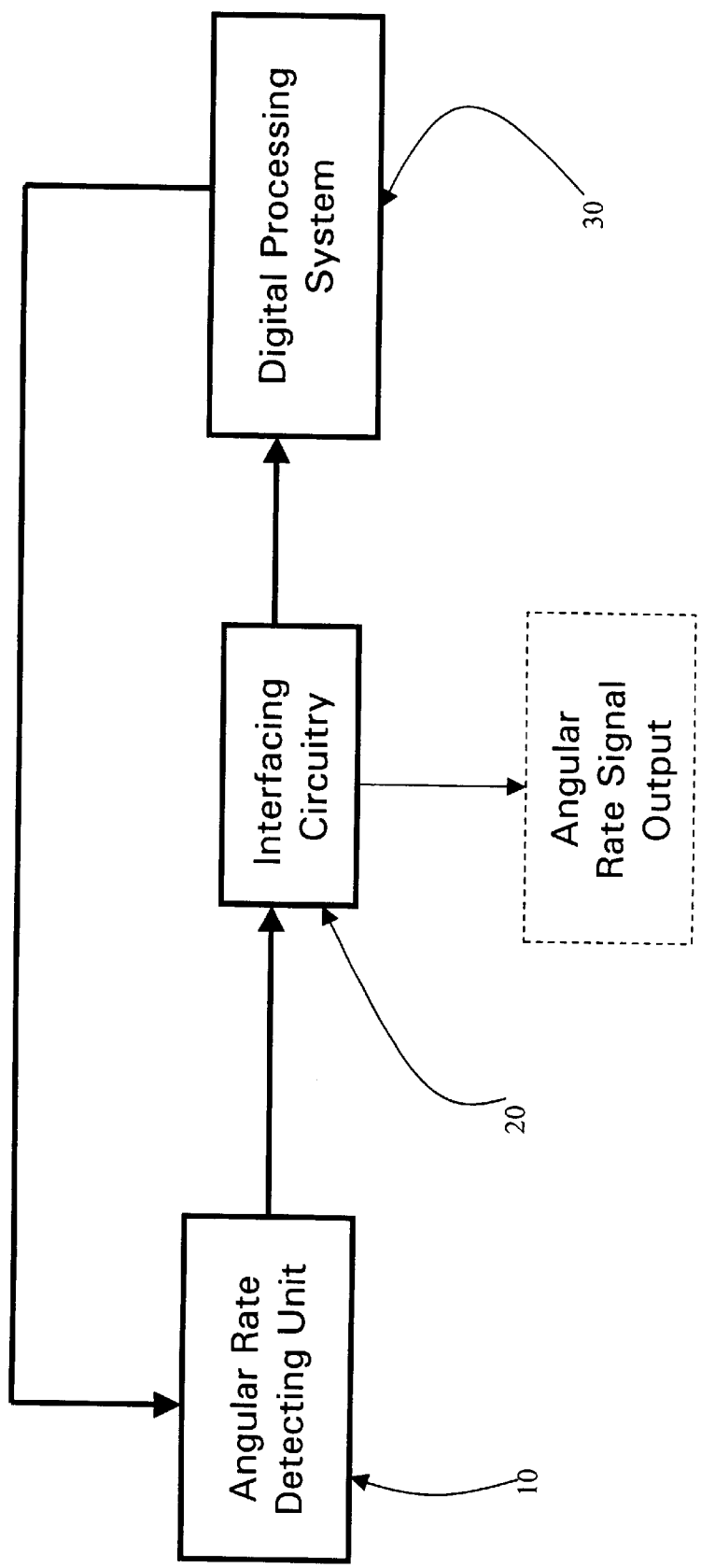
FIG. 3 is a block diagram of an angular rate producer according to a preferred embodiment of the present invention.

The inertial elements are usually suspended electrostatically and oscillate in a specific fashion. The dither drive signals are generally sinusoidal signals with precise amplitude. The vibration frequency and amplitude must be searched, selected, and locked by an external device to make the vibrating type angular rate detecting unit function under an optimal operational mode to obtain improved angular rate sensing accuracy including more sensitivity and more stability. Referring to FIG. 3, the producer of the present invention comprises a vibrating type angular rate detecting unit 10, an interfacing circuitry 20, and a digital processing system 30.

The vibrating type angular rate detecting unit 10 is adapted for detecting angular rate via Corilois Effect, The interfacing circuitry 20 is adapted for converting angular motion-induced signals from the vibrating type angular rate detecting unit 10 into visible angular rate signals and converting inertial element dither motion signals from the vibrating type angular rate detecting unit 10 into processible inertial element dither motion signals.

The digital processing system 30 is adapted for locking the high-quality factor frequency and amplitude of the vibrating inertial elements in the vibrating type angular rate detecting unit 10 by means of providing electrical energy including dither drive signals for the vibrating type angular rate detecting unit 10 using the processible inertial element dither motion signals.

Angular rate detecting unit 10 is a vibratory device, which comprises at least one set of vibrating inertial elements, including tuning forks, and associated supporting structures and means, including capacitive readout means, and uses Coriolis effects to detect vehicle angular rate.

Figure 4:
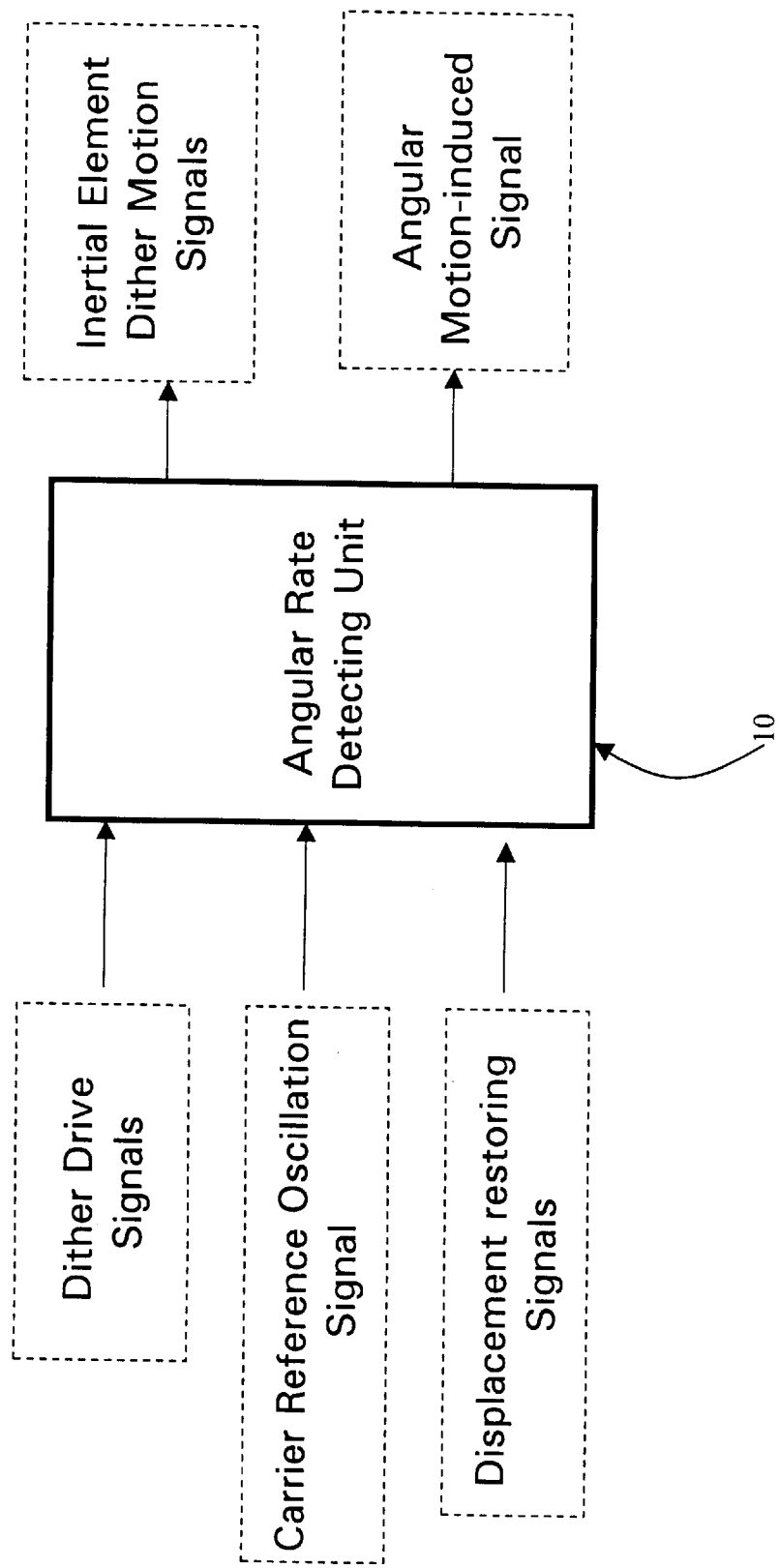
FIG. 4 is a block diagram illustrated the vibrating type angular rate detecting unit according to the above preferred embodiment of the present invention.

Referring to FIG. 4, the first preferred mode of a vibrating type angular rate detecting unit 10 receives signals as follows:

1) dither drive signals to keep the inertial elements oscillating;
2) carrier reference oscillation signals, including capacitive pickoff excitation signals; and
3) displacement restoring signals, including electrostatic torque signals to maintain its inertial elements without offset to obtain improved sensing performance.

The first preferred mode of the vibrating type angular rate detecting unit 10 detects the angular motion of a vehicle in accordance with the dynamic theory (Coriolis force), and outputs signals as follows:

1) angular motion-induced signals, including rate displacement signals which may be modulated carrier reference oscillation signals; and
2) its inertial element dither motion signals, including dither displacement signals.

Figure 5:
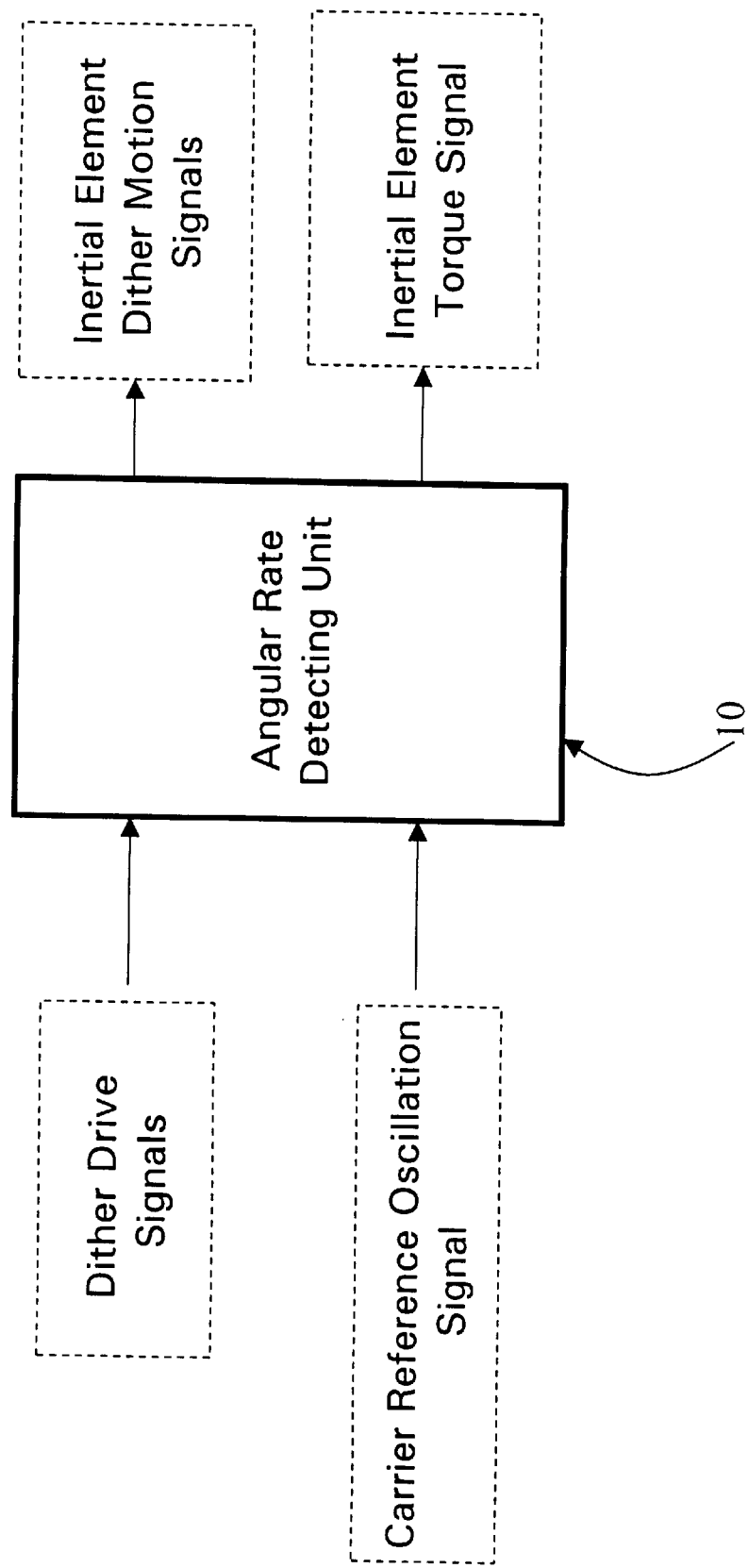
FIG. 5 is a block diagram illustrated an alternative mode of the vibrating type angular rate detecting unit according to the above preferred embodiment of the present invention.

Referring to FIG. 5, the second preferred mode of a vibrating type angular rate detecting unit 10 includes the first preferred vibrating type angular rate detecting unit 10 itself and additional self-torque loops to maintain its inertial elements without offset to obtain improved sensing performance and receives signals as follows:

1) dither drive signals to keep the inertial elements oscillating; and
2) carrier reference oscillation signals, including capacitive pickoff excitation signals.

The second preferred mode of the vibrating type angular rate detecting unit 10 detects the angular motion of a vehicle in accordance with the dynamic theory (Coriolis force), and outputs signals as follows:

1) torque signals; and
2) its inertial element dither motion signals, including dither displacement signals.

According to the present invention, the vibrating type angular rate detecting unit 10 detects vehicle angular motion and outputs angular motion-induced signals, including AC or DC voltage proportional to the angular rate and torque signals, and its inertial element dither motion signals.

The interfacing circuitry 20 converts the angular motion-induced signals into angular rate signals, for example, demodulating the AC voltage into DC voltage proportional to the input angular rate, produces digital inertial element displacement signals with known phase using the inertial element dither motion signals from the vibrating type angular rate detecting unit 10 to a digital processing system 30.

The digital processing system 30 receives digital inertial element displacement signals with known phase from the interfacing circuitry 20 and performs the following:

3.1) finding the frequencies which have highest Quality Factor (Q) Values, 3.2) locking the frequency, and 3.3) locking the amplitude to produce a dither drive signal, including high frequency sinusoidal signals with a precise amplitude, to the vibrating type angular rate detecting unit 10 to keep the inertial elements oscillating at the pre-determined resonant frequency.

Figure 6:
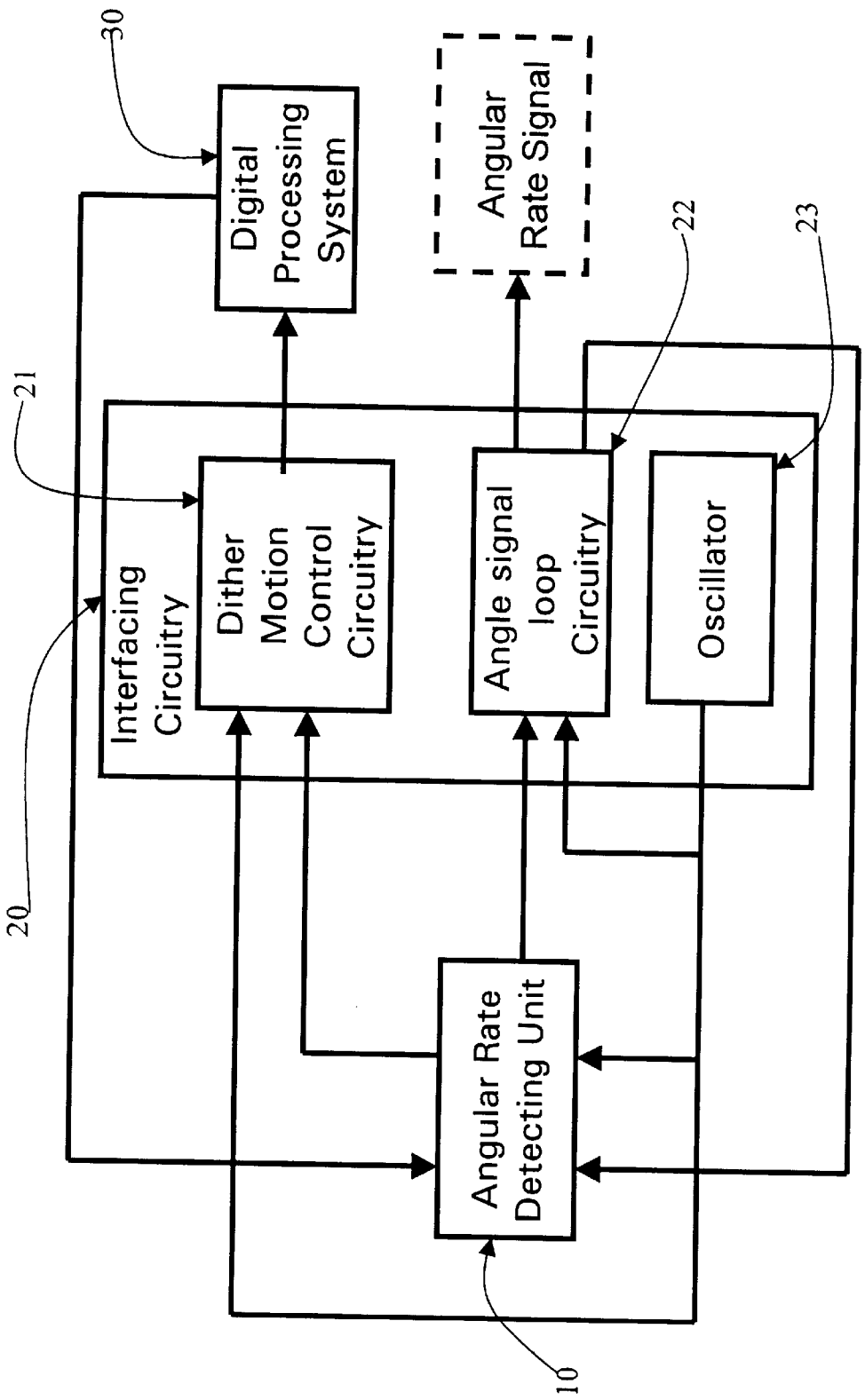
FIG. 6 is a block diagram of the interfacing circuitry according to the above preferred embodiment of the present invention.

Referring to FIG. 6, the interfacing circuitry 20 comprises a dither motion control circuitry 21, an angle signal loop circuitry 22 and an oscillator 23.

The dither motion control circuitry 21 receives the inertial element dither motion signals from vibrating type angular rate detecting unit 10 and reference pickoff signals from an oscillator 23, and produces digital inertial element displacement signals with known phase.

The angle signal loop circuitry receives the angular motion-induced signals from the vibrating type angular rate detecting unit 10 and reference pickoff signals from oscillator 23, and transforms the angular motion-induced signals into angular rate signals.

The oscillator 23 provides reference pickoff signals for vibrating type angular rate detecting unit 10, dither motion control circuitry 21, and angle signal loop circuitry 22.

Figure 7:
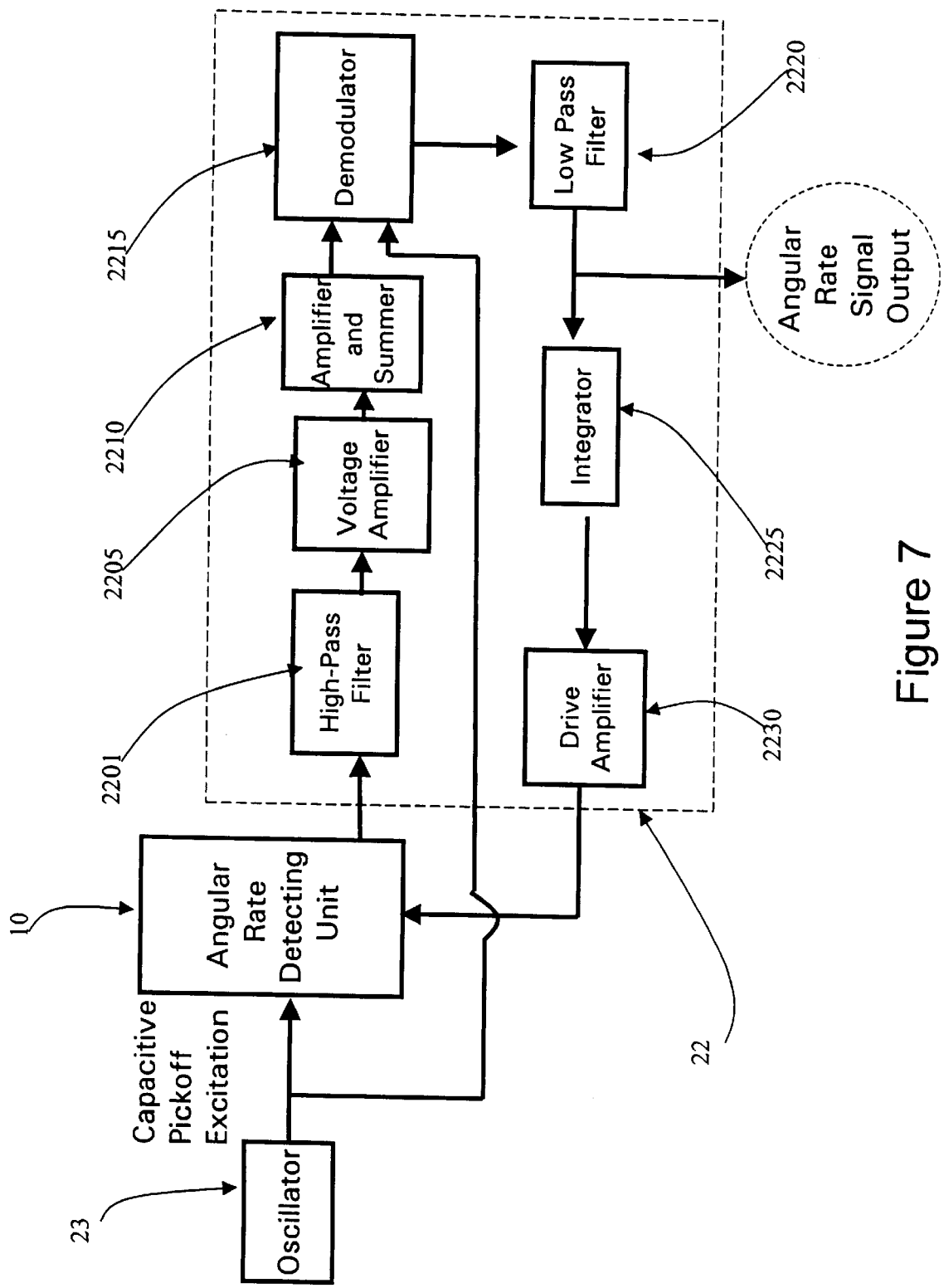
FIG. 7 is a block diagram of the angle signal loop circuitry according to the above preferred embodiment of the present invention.

Referring to FIG. 7, the angle rate signal loop circuitry 22 comprises a high-pass filter circuit 2201, a voltage amplifier circuit 2205, an amplifier and summer circuit 2210, a demodulator 2215, and a low-pass filter 2220.

The high pass filter circuit 2210 is connected to the vibrating type angular rate detecting unit 10 for receiving the angular motion-induced signals by a high-pass filter circuit 2201 and removing low frequency noise of the angular motion-induced signals, which are AC voltage signals output from vibrating type angular rate detecting unit 10, to form filtered angular motion-induced signals;

The voltage amplifier circuit 2205 amplifies the filtered angular motion-induced signals to an extent of at least 100 milivolts to form amplified angular motion-induced signals.

The amplifier and summer circuit 2210 subtracts the difference between the angle rates of the amplified angular motion-induced signals to produce a differential angle rate signal.

The demodulator 2215, which is connected to the amplifier and summer circuit 2210, extracts the amplitude of the in-phase differential angle rate signal from the differential angle rate signal and the capacitive pickoff excitation signals from the oscillator 23.

The low-pass filter 2220, which is connected to the demodulator 2215, removes the high frequency noise of the amplitude signal of the in-phase differential angle rate signal to form the angular rate signal output.

In order to obtain improved performance, including scale factor linearity, the angle rate signal loop circuitry 22 further comprises an integrator 2225 connected with the low-pass filter 2220 for integrating the angular rate signal to form a displacement restoring signal, and a driver amplifier 2230 connected to the integrator 2225 for amplifying the displacement restoring signal to form a driving signal, including a retorque signal, to the vibrating type angular rate detecting unit 10 to maintain the inertial elements of the vibrating type angular rate detecting unit 10 without offset.

Figure 8:
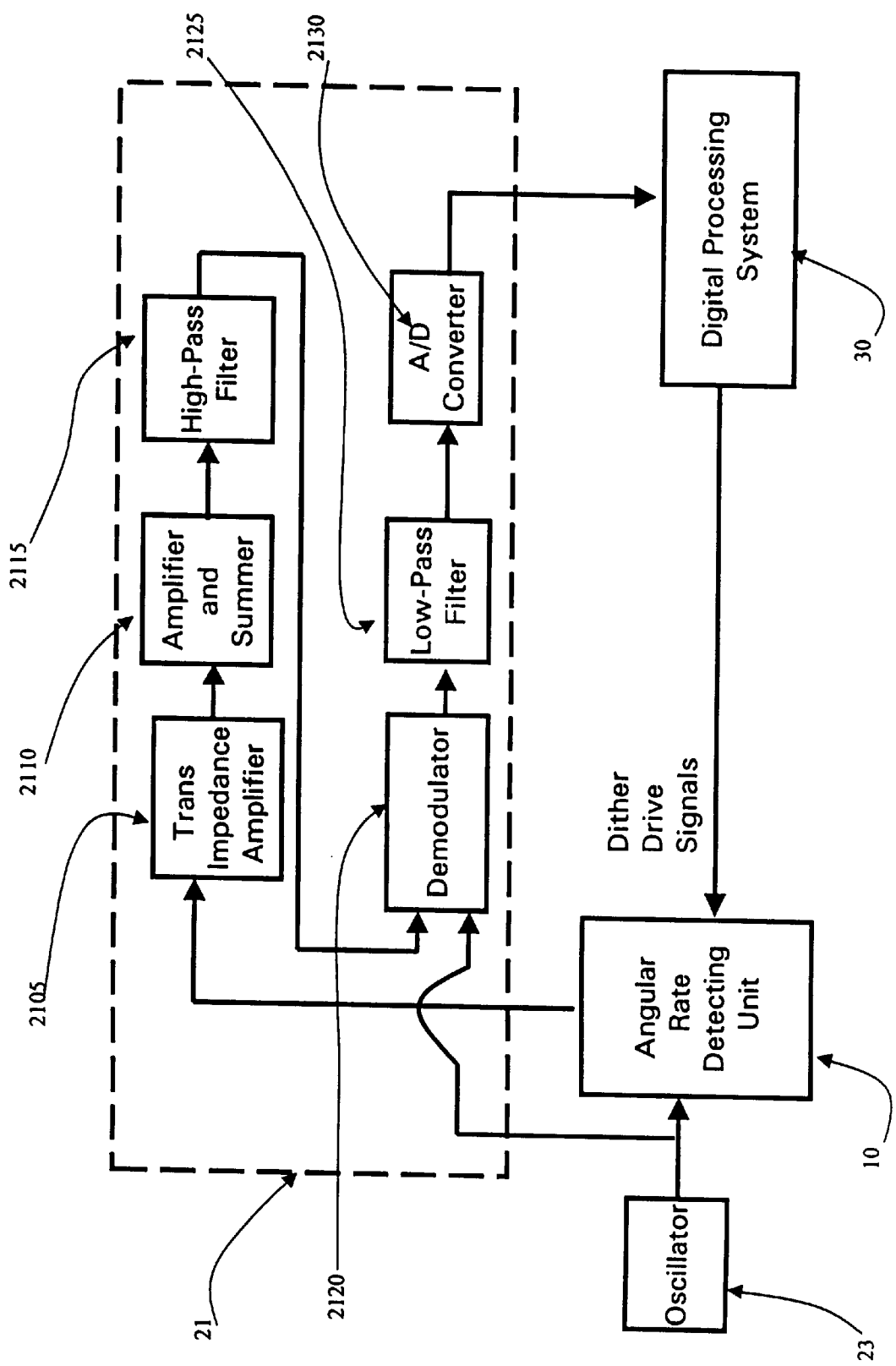
FIG. 8 is a block diagram of the dither motion control circuitry according to the above preferred embodiment of the present invention.

In order to convert the inertial element dither motion signals from the vibrating type angular rate detecting unit 10 to processible inertial element dither motion signals, referring to FIG. 8, the dither motion control circuitry 21 further comprises a trans impedance amplifier circuit 2105, an amplifier and summer circuit 2110, a high-pass filter circuit 2115, a demodulator circuit 2120, a low-pass filter 2125, and an analog/digital converter 2130.

The trans impedance amplifier circuit 2105 is connected to the vibrating type angular rate detecting unit 10 for changing the output impedance of the dither motion signals from a very high level, greater than 100 million ohms, to a low level, less than 100 ohms to achieve two dither displacement signals, which are A/C voltage signals representing the displacement between the inertial elements and the anchor combs.

The amplifier and summer circuit 2110 is connected to the trans impedance amplifier circuit 2105 for amplifying the two dither displacement signals for more than ten times and enhancing the sensitivity for combining the two dither displacement signals to achieve a dither displacement differential signal by subtracting a center anchor comb signal with a side anchor comb signal.

The high-pass filter circuit 2115 is connected to the amplifier and summer circuit 2110 for removing residual dither drive signals and noise from the dither displacement differential signal to form a filtered dither displacement differential signal.

The demodulator circuit 2120 is connected to the high-pass filter circuit 2115 for receiving the capacitive pickoff excitation signals as phase reference signals from an oscillator 23 and the filtered dither displacement differential signal from the high-pass filter 2115 and extracting the in-phase portion of the filtered dither displacement differential signal to produce an inertial element displacement signal with known phase.

The low-pass filter 2125 is connected to the demodulator circuit 2120 for removing high frequency noise from the inertial element displacement signal input thereto to form a low frequency inertial element displacement signal.

The analog/digital converter 2130 is connected to the low-pass filter 2125 for converting the low frequency inertial element displacement signal that is an analog signal to produce a digitized low frequency inertial element displacement signal.

The oscillation of the inertial elements residing inside the vibrating type angular rate detecting unit 10 is generally driven by a high frequency sinusoidal signal with precise amplitude. It is critical to provide the vibrating type angular rate detecting unit 10 with high performance dither drive signals to achieve keen sensitivity and stability of angular rate measurements.

The digital processing system 30 is to search and lock the vibrating frequency and amplitude of the inertial elements of the vibrating type angular rate detecting unit 10.

Therefore, the digitized low frequency inertial element displacement signal is first represented in term of their spectral content by using discrete Fast Fourier Transform (FFT).

Discrete Fast Fourier Transform (FFT) is an efficient algorithm for computing discrete Fourier transform (DFT), which dramatically reduces the computation load imposed by the DFT. The DFT is used to approximate the Fourier transform of a discrete signal. The Fourier transform, or spectrum, of a continuous signal is defined as:

$$X(j\omega) = \int_{-\infty}^{\infty} x(t)e^{-j\omega t} dt$$

The DFT of N samples of a discrete signals X(nT) is given by:

$$X_s(k\omega) = \sum_{n=0}^{N-1} x(nT)e^{-j\omega Tnk}$$

where $\omega=2\pi/NT$, T is the inter-sample time interval. The basic property of FFT is its ability to distinguish waves of different frequencies that have been additively combined.

After the digitized low frequency inertial element displacement signals are represented in terms of their spectral content by using discrete Fast Fourier Transform (FFT), Q (Quality Factor) Analysis is applied to their spectral content to determine the frequency with global maximal Q value. The vibration of the inertial elements of the vibrating type angular rate detecting unit 10 at the frequency with global maximal Q value can result in minimal power consumption and cancel many of the terms that affect the excited mode. The Q value is a function of basic geometry, material properties, and ambient operating conditions.

A phase-locked loop and D/A converter is further used to control and stabilize the selected frequency and amplitude.

Figure 9:
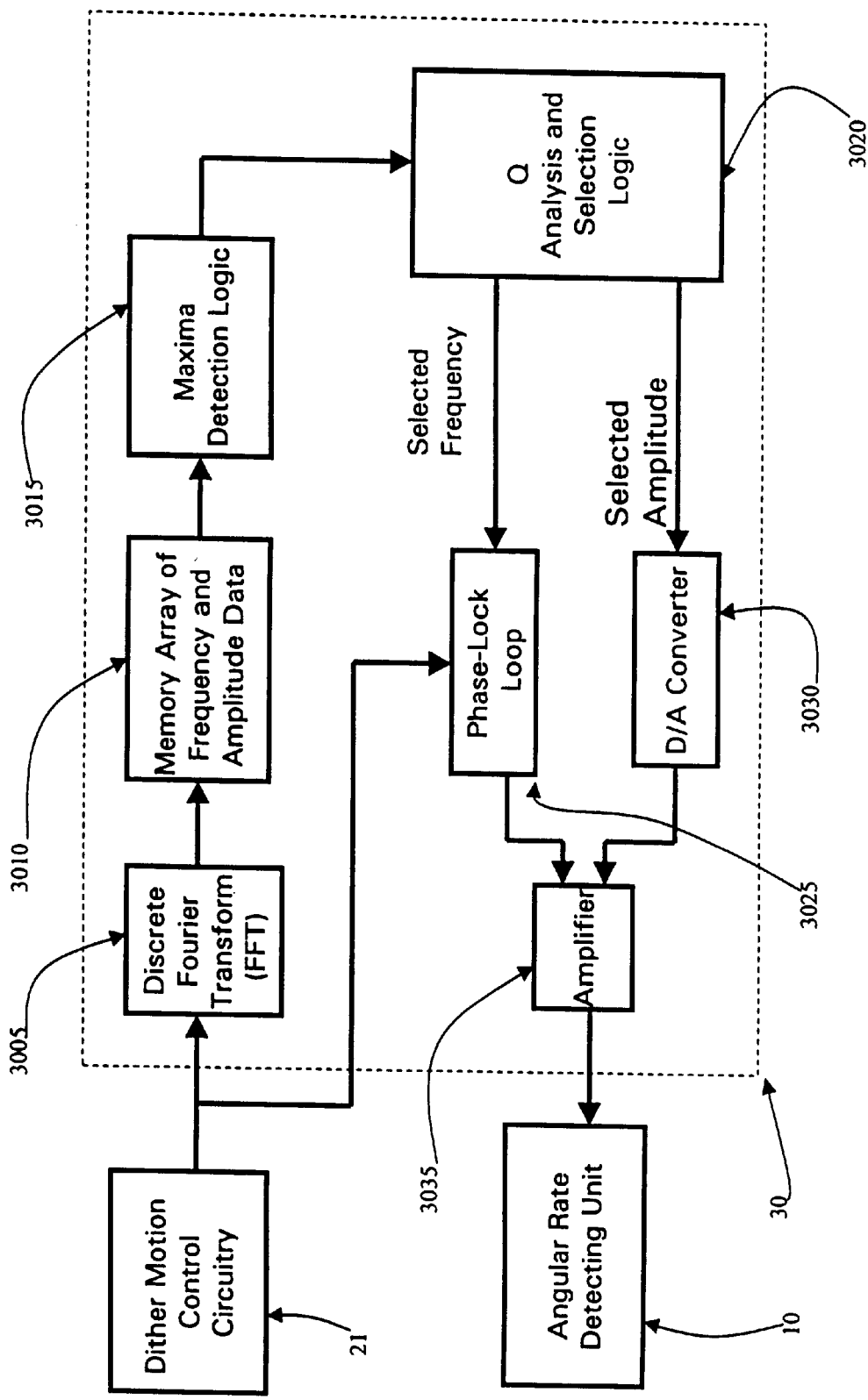
FIG. 9 is a block the diagram of the digital processing system according to the above preferred embodiment of the present invention.

Referring to FIG. 9, the digital processing system 30 further includes a discrete Fast Fourier Transform (FFT) module 3005, a memory array of frequency and amplitude data module 3010, a maxima detection logic module 3015, and a Q analysis and selection logic module 3020 to complete the above step 3.1 of finding the frequencies which have highest Quality Factor (Q) Values.

The discrete Fast Fourier Transform (FFT) module 3005 is arranged for transforming the digitized low frequency inertial element displacement signal from the analog/digital converter 2130 of dither motion control circuitry 21 to form amplitude data with the frequency spectrum of the input inertial element displacement signal.

The memory array of frequency and amplitude data module 3010 receives the amplitude data with frequency spectrum to form an array of amplitude data with frequency spectrum.

The maxima detection logic module 3015 is adapted for partitioning the frequency spectrum from the array of the amplitude data with frequency into plural spectrum segments, and choosing those frequencies with the largest amplitudes in the local segments of the frequency spectrum.

The Q analysis and selection logic module 3020 is adapted for performing Q analysis on the chosen frequencies to select frequency and amplitude by computing the ratio of amplitude/bandwidth, wherein the range for computing bandwidth is between +−½ of the peek for each maximum frequency point.

Moreover, the digital processing system 30 further includes a phase-lock loop 3025 to reject noise of the selected frequency to form a dither drive signal with the selected frequency by, which serves as a very narrow bandpass filter, during the above step 3.2 of locking the frequency.

The digital processing system 30 further includes a D/A converter 3030 and an amplifier 3035 to process the above step 3.3, wherein the D/A converter 3030 processes the selected amplitude to form a dither drive signal with correct amplitude and the amplifier 3035 generates and amplifies the dither drive signal to the vibrating type angular rate detecting unit 10 based on the dither drive signal with the selected frequency and correct amplitude.

Figure 10:
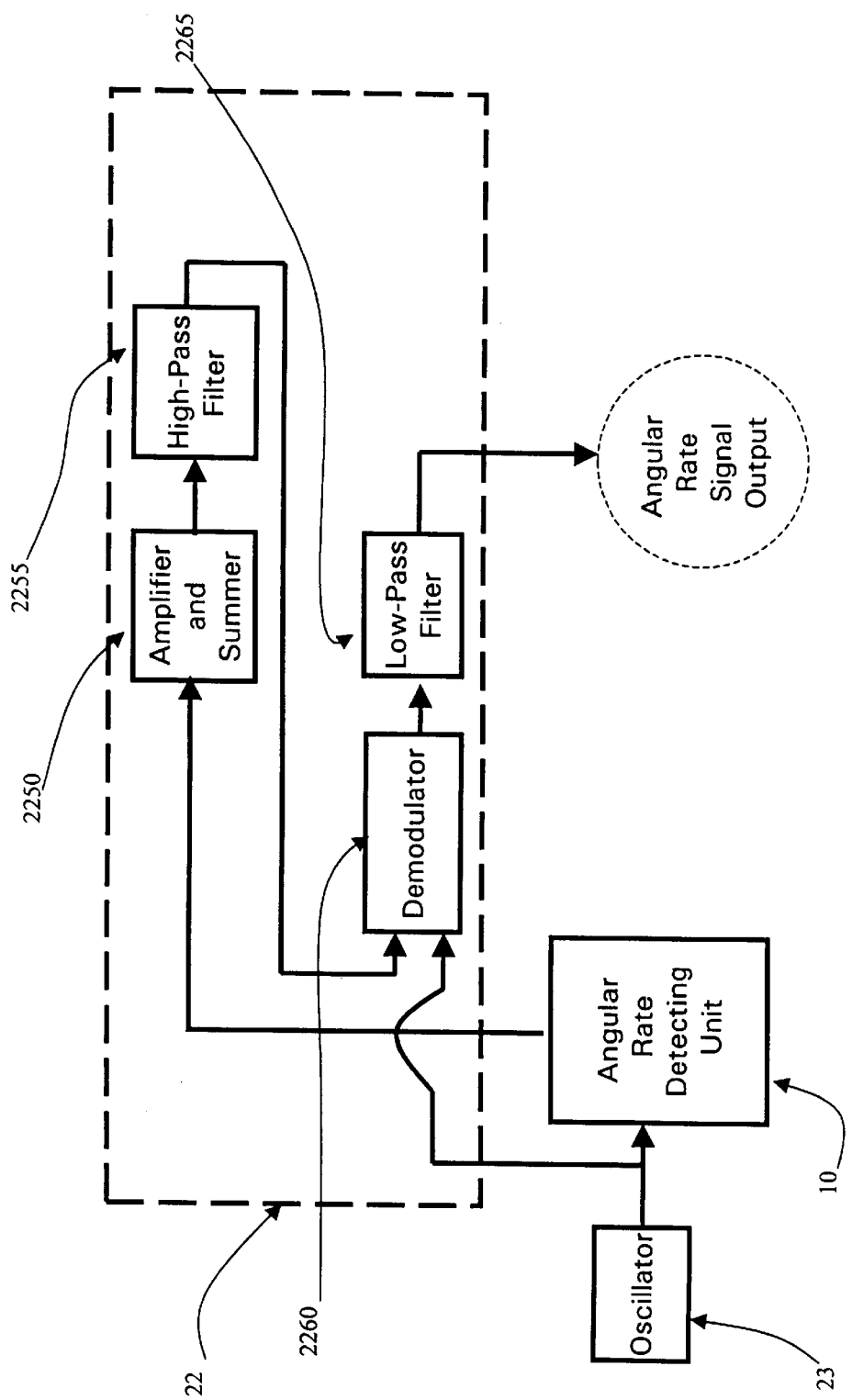
FIG. 10 is a block diagram of an alternative mode of the angle signal loop circuitry adapted for the alternative mode of the vibrating type angular rate detecting unit according to the above preferred embodiment of the present invention.

In order to process the torque signals from the second preferred vibrating type angular rate detecting unit 10, referring to FIG. 5 and FIG. 10, the angle rate signal loop circuitry 22 further comprises:

an amplifier and summer circuit 2250, which is connected to a torque amplifier of the vibrating type angular rate detecting unit 10, for amplifying the torque signals and enhancing the sensitivity for more than ten times;

a high-pass filter circuit 2255, which is connected to the amplifier and summer circuit 2250, for removing residual drive signals and noise from the torque signal to form a filtered torque drive differential signal;

a demodulator circuit 2260, which is connected to the high-pass filter circuit 2255, for receiving the carrier reference signals as phase reference signals from the oscillator 23 and the filtered torque drive differential signal from the high-pass filter circuit 2255, and extracting the in-phase portion of the filtered torque drive differential signal to produce an inertial element rotation rate signal with known phase; and a low-pass filter 2265, which is connected to the demodulator circuit 2260, for removing high frequency noise from the inertial element rotation signal input thereto to form a low frequency inertial element rotation signal as output angular rate signals.

In view of above, when the angular rate producer of the present invention is employed to produce a kind of micro IMU, such micro IMU can achieve the following unique features:

(1) Attitude Heading Reference System (AHRS) Capable Core Sensor Module.

(2) Miniaturized (Length/Width/Height) and Light Weight.

(3) High Performance and Low Cost.

(4) Low Power Dissipation.

(5) Dramatic Improvement In Reliability (microelectromechanical systems—MEMS).

Moreover, if such a micro IMU employed with the angular rate producer of the present invention is utilized to produce an integrated micro land navigator, it can achieve the following unique features:

(1) Miniature, light weight, low power, low cost.

(2) AHRS, odometer, integrated GPS chipset and flux valve.

(3) Integration filter for sensor data fusion and zero velocity updating.

(4) Typical applications: automobiles, railway vehicles, miniature land vehicles, robots, unmanned ground vehicles, personal navigators, and military land vehicles.

Also, when such a micro IMU employed with the angular rate producer of the present invention is functioned as aircraft inertial avionics, it can achieve the following unique features:

(1) Rate Gyro (2) Vertical Gyro (3) Directional Gyro (4) AHRS (5) IMU (6) Inertial Navigation System (7) Fully-Coupled GPS/MEMS IMU Integrated System (8) Fully-Coupled GPS/IMU/Radar Altimeter Integrated System (9) Universal vehicle navigation and control box.

Besides the angular rate producer of the present invention also enables the micro IMU to be a Spaceborne MEMS IMU Attitude Determination System and a Spaceborne Fully-Coupled GPS/MEMS IMU Integrated system for orbit determination, attitude control, payload pointing, and formation flight, which has the following unique features:

(1) Shock resistant and vibration tolerant (2) High anti-jamming (3) High dynamic performance (4) Broad operating range of temperatures (5) High resolution (6) Compact, low power and light weight unit (7) Flexible hardware and software architecture Also, when the micro IMU employed with the angular rate producer with microelectromechanical system (MEMS) technology of the present invention is functioned as a marine INS with embedded GPS, it has the following unique features:

(1) Micro MEMS IMU AHRS with Embedded GPS (2) Built-in CDU (Control Display Unit)

(3) Optional DGPS (Differential GPS)

(4) Flexible Hardware and Software System Architecture (5) Low Cost, Light Weight, High Reliability Again, when the micro IMU employed with the angular rate producer with microelectromechanical system (MEMS) technology of the present invention enables that the core micro IMU is used in a micro pointing and stabilization mechanism, it has the following unique features:

(1) Micro MEMS IMU AHRS utilized for platform stabilization.

(2) MEMS IMU integrated with the electrical and mechanical design of the pointing and stabilization mechanism.

(3) Vehicle motion, vibration, and other interference cancelled by a stabilized platform.

(4) Variable pointing angle for tracker implementations.

(5) Micro MEMS IMU utilized for a micro fire control system for sniper rifles.

(6) Typical applications: miniature antenna pointing and tracking control, laser beam pointing for optical conmmunications, telescopic pointing for imaging, airborne laser pointing control for targeting, vehicle control and guidance.

In view of above, the present invention can be used as a motion measurement device for both commercial and government systems required by phased array antenna systems for communication on-the-move. Specific applications include pointing control systems for mobile satellite reception for truckers and radiotelephone and direct broadcast satellite reception. The development of a low cost attitude and heading reference system is critical to wide deployment of these systems in the commercial arena.

The present invention will be described as it applies to its preferred embodiment. It is not intended that the present invention be limited to the described embodiment. It is intended that the invention covers all alternatives, modifications, and equivalencies which may be included within the spirit and scope of the invention.

What is claimed is:

1. An angular rate producer with microelectromechanical system technology for measuring a vehicle angular rate, comprising:

an angular rate detecting unit receiving dither drive signal to maintain an oscillation of at least one set of inertial element with constant momentum and producing angular motion-induced signals with respect to said vehicle angular rate and inertial element dither motion signals;

an interfacing means for converting said angular motion-induced signals from said angular rate detecting unit into consistent and repeatable angular rate signals that are proportional to said vehicle angular rate, and converting said inertial element dither motion signals from said angular rate detecting unit into digital element displacement signals with predetermined phase; and a digital processing system for inputting said digital element displacement signals for producing said dither drive signal for locking high-quality factor frequency and amplitude of said oscillating inertial element in said angular rate detecting unit.

2. The angular rate producer, as recited in claim 1, wherein said angular rate detecting unit is a vibrating type angular rate detecting unit for detecting vehicle angular motions and outputting said angular motion-induced signals which are voltages proportional to angular rate and torque signals.

3. The angular rate producer, as recited in claim 1, wherein said angular rate detecting unit is a vibrating type angular rate detecting unit for detecting angular rate through Corilois Effect.

4. The angular rate producer, as recited in claim 3, wherein said vibrating type angular rate detecting unit receives dither drive signal to keep said inertial elements oscillating; carrier reference oscillation signals, including capacitive pickoff excitation signals; and displacement restoring signals, including electrostatic torque signals to maintain said inertial elements without offset to obtain improved sensing performance.

5. The angular rate producer, as recited in claim 4, wherein said vibrating type angular rate detecting unit detects angular motion of a vehicle in accordance with dynamic theory, that is Coriolis Effect, and outputs said angular motion-induced signals, including rate displacement signals which may be modulated carrier reference oscillation signals, and said inertial element dither motion signals, including dither displacement signals.

6. The angular rate producer, as recited in claim 3, wherein said angular rate detecting unit further includes an additional self-torque loops to maintain said inertial elements without offset to obtain improved sensing performance and receives said dither drive signal to keep said inertial elements oscillating, and said carrier reference oscillation signals, including capacitive pickoff excitation signals.

7. The angular rate producer, as recited in claim 6, wherein said vibrating type angular rate detecting unit detects angular motions of a vehicle in accordance with a dynamic theory, that is Coriolis Effect, and outputs torque signals, and said inertial element dither motion signals, including dither displacement signals.

8. The angular rate producer, as recited in claim 1, 2 or 3, wherein said digital processing system receives said digital inertial element displacement signals with known phase from said interfacing circuitry for finding frequencies which have highest Quality Factor (Q) Values, locking said frequencies, and locking an amplitude to produce said dither drive signal, including high frequency sinusoidal signals with a precise amplitude, to said angular rate detecting unit to keep said inertial elements oscillating at a predetermined resonant frequency.

9. The angular rate producer, as recited in claim 1, 2 or 3, wherein said interfacing means comprises an interfacing circuitry which comprises:

an oscillator for providing reference pickoff signals;

a dither motion control circuitry for receiving said inertial element dither motion signals from said vibrating type angular rate detecting unit and said reference pickoff signals from said oscillator, and producing said digital inertial element displacement signals with known phase; and an angle signal loop circuitry for receiving said angular motion-induced signals from said vibrating type angular rate detecting unit and said reference pickoff signals from said oscillator, and transforming said angular motion-induced signals into said angular rate signals.

10. The angular rate producer, as recited in claim 8, wherein said interfacing means comprises an interfacing circuitry which comprises:

an oscillator for providing reference pickoff signals;

a dither motion control circuitry for receiving said inertial element dither motion signals from said vibrating type angular rate detecting unit and said reference pickoff signals from said oscillator, and producing said digital inertial element displacement signals with known phase; and an angle signal loop circuitry for receiving said angular motion-induced signals from said vibrating type angular rate detecting unit and said reference pickoff signals from said oscillator, and transforming said angular motion-induced signals into said angular rate signals.

11. The angular rate producer, as recited in claim 9, wherein said angle rate signal loop circuitry comprises:

a high pass filter circuit, which is connected to said vibrating type angular rate detecting unit, for receiving said angular motion-induced signals and removing low frequency noise of said angular motion-induced signals, which are AC voltage signals output from vibrating type angular rate detecting unit, to form filtered angular motion-induced signals;

a voltage amplifier circuit for amplifying said filtered angular motion-induced signals to an extent of at least 100 milivolts to form amplified angular motion-induced signals;

an amplifier and summer circuit for subtracting a difference between said angle rates of said amplified angular motion-induced signals to produce a differential angle rate signal;

a demodulator, which is connected to said amplifier and summer circuit, for extracting an amplitude of said in-phase differential angle rate signal from said differential angle rate signal and said capacitive pickoff excitation signals from said oscillator; and a low-pass filter, which connected to said demodulator, for removing a high frequency noise of said amplitude signal of said in-phase differential angle rate signal to form said angular rate signal output.

12. The angular rate producer, as recited in claim 10, wherein said angle rate signal loop circuitry comprises:

a high pass filter circuit, which is connected to said vibrating type angular rate detecting unit, for receiving said angular motion-induced signals and removing low frequency noise of said angular motion-induced signals, which are AC voltage signals output from vibrating type angular rate detecting unit, to form filtered angular motion-induced signals;

a voltage amplifier circuit for amplifying said filtered angular motion-induced signals to an extent of at least 100 milivolts to form amplified angular motion-induced signals;

an amplifier and summer circuit for subtracting a difference between said angle rates of said amplified angular motion-induced signals to produce a differential angle rate signal;

a demodulator, which is connected to said amplifier and summer circuit, for extracting an amplitude of said in-phase differential angle rate signal from said differential angle rate signal and said capacitive pickoff excitation signals from said oscillator; and a low-pass filter, which connected to said demodulator, for removing a high frequency noise of said amplitude signal of said in-phase differential angle rate signal to form said angular rate signal output.

13. The angular rate producer, as recited in claim 11, wherein said angle rate signal loop circuitry further comprises an integrator connected with said low-pass filter for integrating said angular rate signal to form a displacement restoring signal, and a driver amplifier connected to said integrator for amplifying said displacement restoring signal to form a driving signal, including a re-torque signal, to said vibrating type angular rate detecting unit to maintain said inertial elements of said vibrating type angular rate detecting unit without offset.

14. The angular rate producer, as recited in claim 12, wherein said angle rate signal loop circuitry further comprises an integrator connected with said low-pass filter for integrating said angular rate signal to form a displacement restoring signal, and a driver amplifier connected to said integrator for amplifying said displacement restoring signal to form a driving signal, including a re-torque signal, to said vibrating type angular rate detecting unit to maintain said inertial elements of said vibrating type angular rate detecting unit without offset.

15. The angular rate producer, as recited in claim 9, wherein said dither motion control circuitry further comprises:

a trans impedance amplifier circuit, which is connected to said vibrating type angular rate detecting unit, for changing said output impedance of said dither motion signals from a very high level, greater than 100 million ohms, to a low level, less than 100 ohms to achieve two dither displacement signals, which are A/C voltage signals representing said displacement between said inertial elements and said anchor combs;

an amplifier and summer circuit, which is connected to said trans impedance amplifier circuit, for amplifying said two dither displacement signals for more than ten times and enhancing said sensitivity for combining said two dither displacement signals to achieve a dither displacement differential signal by subtracting a center anchor comb signal with a side anchor comb signal;

a high-pass filter circuit, which is connected to said amplifier and summer circuit, for removing residual dither drive signal and noise from said dither displacement differential signal to form a filtered dither displacement differential signal;

a demodulator circuit, which is connected to said high-pass filter circuit, for receiving said capacitive pickoff excitation signals as phase reference signals from an oscillator and said filtered dither displacement differential signal from said high-pass filter and extracting said in-phase portion of said filtered dither displacement differential signal to produce an inertial element displacement signal with known phase;

a low-pass filter, which is connected to said demodulator circuit, for removing high frequency noise from said inertial element displacement signal input thereto to form a low frequency inertial element displacement signal; and an analog/digital converter, which is connected to said low-pass filter, for converting said low frequency inertial element displacement signal that is an analog signal to produce a digitized low frequency inertial element displacement signal.

16. The angular rate producer, as recited in claim 10, wherein said dither motion control circuitry further comprises:

a trans impedance amplifier circuit, which is connected to said vibrating type angular rate detecting unit, for changing said output impedance of said dither motion signals from a very high level, greater than 100 million ohms, to a low level, less than 100 ohms to achieve two dither displacement signals, which are A/C voltage signals representing said displacement between said inertial elements and said anchor combs;

an amplifier and summer circuit, which is connected to said trans impedance amplifier circuit, for amplifying said two dither displacement signals for more than ten times and enhancing said sensitivity for combining said two dither displacement signals to achieve a dither displacement differential signal by subtracting a center anchor comb signal with a side anchor comb signal;

a high-pass filter circuit, which is connected to said amplifier and summer circuit, for removing residual dither drive signal and noise from said dither displacement differential signal to form a filtered dither displacement differential signal;

a demodulator circuit, which is connected to said high-pass filter circuit, for receiving said capacitive pickoff excitation signals as phase reference signals from an oscillator and said filtered dither displacement differential signal from said high-pass filter and extracting said in-phase portion of said filtered dither displacement differential signal to produce an inertial element displacement signal with known phase;

a low-pass filter, which is connected to said demodulator circuit, for removing high frequency noise from said inertial element displacement signal input thereto to form a low frequency inertial element displacement signal; and an analog/digital converter, which is connected to said low-pass filter, for converting said low frequency inertial element displacement signal that is an analog signal to produce a digitized low frequency inertial element displacement signal.

17. The angular rate producer, as recited in claim 11, wherein said dither motion control circuitry further comprises:

a trans impedance amplifier circuit, which is connected to said vibrating type angular rate detecting unit, for changing said output impedance of said dither motion signals from a very high level, greater than 100 million ohms, to a low level, less than 100 ohms to achieve two dither displacement signals, which are A/C voltage signals representing said displacement between said inertial elements and said anchor combs;

an amplifier and summer circuit, which is connected to said trans impedance amplifier circuit, for amplifying said two dither displacement signals for more than ten times and enhancing said sensitivity for combining said two dither displacement signals to achieve a dither displacement differential signal by subtracting a center anchor comb signal with a side anchor comb signal;

a high-pass filter circuit, which is connected to said amplifier and summer circuit, for removing residual dither drive signal and noise from said dither displacement differential signal to form a filtered dither displacement differential signal;

a demodulator circuit, which is connected to said high-pass filter circuit, for receiving said capacitive pickoff excitation signals as phase reference signals from an oscillator and said filtered dither displacement differential signal from said high-pass filter and extracting said in-phase portion of said filtered dither displacement differential signal to produce an inertial element displacement signal with known phase;

a low-pass filter, which is connected to said demodulator circuit, for removing high frequency noise from said inertial element displacement signal input thereto to form a low frequency inertial element displacement signal; and an analog/digital converter, which is connected to said low-pass filter, for converting said low frequency inertial element displacement signal that is an analog signal to produce a digitized low frequency inertial element displacement signal.

18. The angular rate producer, as recited in claim 12, wherein said dither motion control circuitry further comprises:

a trans impedance amplifier circuit, which is connected to said vibrating type angular rate detecting unit, for changing said output impedance of said dither motion signals from a very high level, greater than 100 million ohms, to a low level, less than 100 ohms to achieve two dither displacement signals, which are A/C voltage signals representing said displacement between said inertial elements and said anchor combs;

an amplifier and summer circuit, which is connected to said trans impedance amplifier circuit, for amplifying said two dither displacement signals for more than ten times and enhancing said sensitivity for combining said two dither displacement signals to achieve a dither displacement differential signal by subtracting a center anchor comb signal with a side anchor comb signal;

a high-pass filter circuit, which is connected to said amplifier and summer circuit, for removing residual dither drive signal and noise from said dither displacement differential signal to form a filtered dither displacement differential signal;

a demodulator circuit, which is connected to said high-pass filter circuit, for receiving said capacitive pickoff excitation signals as phase reference signals from an oscillator and said filtered dither displacement differential signal from said high-pass filter and extracting said in-phase portion of said filtered dither displacement differential signal to produce an inertial element displacement signal with known phase;

a low-pass filter, which is connected to said demodulator circuit, for removing high frequency noise from said inertial element displacement signal input thereto to form a low frequency inertial element displacement signal; and an analog/digital converter, which is connected to said low-pass filter, for converting said low frequency inertial element displacement signal that is an analog signal to produce a digitized low frequency inertial element displacement signal.

19. The angular rate producer, as recited in claim 13, wherein said dither motion control circuitry further comprises:

a trans impedance amplifier circuit, which is connected to said vibrating type angular rate detecting unit, for changing said output impedance of said dither motion signals from a very high level, greater than 100 million ohms, to a low level, less than 100 ohms to achieve two dither displacement signals, which are A/C voltage signals representing said displacement between said inertial elements and said anchor combs;

an amplifier and summer circuit, which is connected to said trans impedance amplifier circuit, for amplifying said two dither displacement signals for more than ten times and enhancing said sensitivity for combining said two dither displacement signals to achieve a dither displacement differential signal by subtracting a center anchor comb signal with a side anchor comb signal;

a high-pass filter circuit, which is connected to said amplifier and summer circuit, for removing residual dither drive signal and noise from said dither displacement differential signal to form a filtered dither displacement differential signal;

a demodulator circuit, which is connected to said high-pass filter circuit, for receiving said capacitive pickoff excitation signals as phase reference signals from an oscillator and said filtered dither displacement differential signal from said high-pass filter and extracting said in-phase portion of said filtered dither displacement differential signal to produce an inertial element displacement signal with known phase;

a low-pass filter, which is connected to said demodulator circuit, for removing high frequency noise from said inertial element displacement signal input thereto to form a low frequency inertial element displacement signal; and an analog/digital converter, which is connected to said low-pass filter, for converting said low frequency inertial element displacement signal that is an analog signal to produce a digitized low frequency inertial element displacement signal.

20. The angular rate producer, as recited in claim 14, wherein said dither motion control circuitry further comprises:

a trans impedance amplifier circuit, which is connected to said vibrating type angular rate detecting unit, for changing said output impedance of said dither motion signals from a very high level, greater than 100 million ohms, to a low level, less than 100 ohms to achieve two dither displacement signals, which are A/C voltage signals representing said displacement between said inertial elements and said anchor combs;

an amplifier and summer circuit, which is connected to said trans impedance amplifier circuit, for amplifying said two dither displacement signals for more than ten times and enhancing said sensitivity for combining said two dither displacement signals to achieve a dither displacement differential signal by subtracting a center anchor comb signal with a side anchor comb signal;

a high-pass filter circuit, which is connected to said amplifier and summer circuit, for removing residual dither drive signal and noise from said dither displacement differential signal to form a filtered dither displacement differential signal;

a demodulator circuit, which is connected to said high-pass filter circuit, for receiving said capacitive pickoff excitation signals as phase reference signals from an oscillator and said filtered dither displacement differential signal from said high-pass filter and extracting said in-phase portion of said filtered dither displacement differential signal to produce an inertial element displacement signal with known phase;

a low-pass filter, which is connected to said demodulator circuit, for removing high frequency noise from said inertial element displacement signal input thereto to form a low frequency inertial element displacement signal; and an analog/digital converter, which is connected to said low-pass filter, for converting said low frequency inertial element displacement signal that is an analog signal to produce a digitized low frequency inertial element displacement signal.

21. The angular rate producer, as recited in claim 1, wherein said oscillation of said inertial elements residing inside said vibrating type angular rate detecting unit is driven by a high frequency sinusoidal signal with precise amplitude.

22. The angular rate producer, as recited in claim 20, wherein said oscillation of said inertial elements residing inside said vibrating type angular rate detecting unit is driven by a high frequency sinusoidal signal with precise amplitude.

23. The angular rate producer, as recited in claim 20, wherein said digitized low frequency inertial element displacement signal is first represented in term of a spectral content thereof by using discrete Fast Fourier Transform (FFT), which is an efficient algorithm for computing discrete Fourier transform (DFT), which dramatically reduces said computation load imposed by said DFT, which is used to approximate said Fourier transform of a discrete signal.

24. The angular rate producer, as recited in claim 23, wherein after said digitized low frequency inertial element displacement signals are represented in terms of their spectral content by using discrete Fast Fourier Transform (FFT), Q (Quality Factor) Analysis is applied to their spectral content to determine said frequency with global maximal Q value which is a function of basic geometry, material properties, and ambient operating conditions, said vibration of said inertial elements of said vibrating type angular rate detecting unit at said frequency with global maximal Q value resulting in minimal power consumption and canceling terms that affect said excited mode.

25. The angular rate producer, as recited in claim 24, further comprising a phase-locked loop and D/A converter for controlling and stabilizing said selected frequency and amplitude.

26. The angular rate producer, as recited in claim 16, wherein, in order to find said frequencies having highest Quality Factor (Q) values, said digital processing system includes:

a discrete Fast Fourier Transform (FFT) module, which is arranged for transforming said digitized low frequency inertial element displacement signal from said analog/digital converter of dither motion control circuitry to form amplitude data with said frequency spectrum of said input inertial element displacement signal;

a memory array of frequency and amplitude data module for receiving said amplitude data with frequency spectrum to form an array of amplitude data with frequency spectrum;

a maxima detection logic module for partitioning said frequency spectrum from said array of said amplitude data with frequency into plural spectrum segments, and choosing those frequencies with said largest amplitudes in said local segments of said frequency spectrum;

a Q analysis and selection logic module, which is adapted for performing Q analysis on said chosen frequencies to select frequency and amplitude by computing said ratio of amplitude/bandwidth, wherein said range for computing bandwidth is between +−½ of said peek for each maximum frequency point.

27. The angular rate producer, as recited in claim 18, wherein, in order to find said frequencies having highest Quality Factor (Q) values, said digital processing system includes:

a discrete Fast Fourier Transform (FFT) module, which is arranged for transforming said digitized low frequency inertial element displacement signal from said analog/digital converter of dither motion control circuitry to form amplitude data with said frequency spectrum of said input inertial element displacement signal;

a memory array of frequency and amplitude data module for receiving said amplitude data with frequency spectrum to form an array of amplitude data with frequency spectrum;

a maxima detection logic module for partitioning said frequency spectrum from said array of said amplitude data with frequency into plural spectrum segments, and choosing those frequencies with said largest amplitudes in said local segments of said frequency spectrum;

a Q analysis and selection logic module, which is adapted for performing Q analysis on said chosen frequencies to select frequency and amplitude by computing said ratio of amplitude/bandwidth, wherein said range for computing bandwidth is between +−½ of said peek for each maximum frequency point.

28. The angular rate producer, as recited in claim 20, wherein, in order to find said frequencies having highest Quality Factor (Q) values, said digital processing system includes:

a discrete Fast Fourier Transform (FFT) module, which is arranged for transforming said digitized low frequency inertial element displacement signal from said analog/digital converter of dither motion control circuitry to form amplitude data with said frequency spectrum of said input inertial element displacement signal;

a memory array of frequency and amplitude data module for receiving said amplitude data with frequency spectrum to form an array of amplitude data with frequency spectrum;

a maxima detection logic module for partitioning said frequency spectrum from said array of said amplitude data with frequency into plural spectrum segments, and choosing those frequencies with said largest amplitudes in said local segments of said frequency spectrum;

a Q analysis and selection logic module, which is adapted for performing Q analysis on said chosen frequencies to select frequency and amplitude by computing said ratio of amplitude/bandwidth, wherein said range for computing bandwidth is between +−½ of said peek for each maximum frequency point.

29. The angular rate producer, as recited in claim 8, wherein said digital processing system further includes a phase-lock loop to reject noise of said selected frequency to form a dither drive signal with said selected frequency by, which serves as a very narrow bandpass filter.

30. The angular rate producer, as recited in claim 26, wherein said digital processing system further includes a phase-lock loop to reject noise of said selected frequency to form a dither drive signal with said selected frequency by, which serves as a very narrow bandpass filter.

31. The angular rate producer, as recited in claim 27, wherein said digital processing system further includes a phase-lock loop to reject noise of said selected frequency to form a dither drive signal with said selected frequency by, which serves as a very narrow bandpass filter.

32. The angular rate producer, as recited in claim 28, wherein said digital processing system further includes a phase-lock loop to reject noise of said selected frequency to form a dither drive signal with said selected frequency by, which serves as a very narrow bandpass filter.

33. The angular rate producer, as recited in claim 8, wherein said digital processing system further includes a D/A converter for processing said selected amplitude to form said dither drive signal with correct amplitude, and an amplifier for generating and amplifying said dither drive signal to said angular rate detecting unit based on said dither drive signal with said selected frequency and correct amplitude.

34. The angular rate producer, as recited in claim 26, wherein said digital processing system further includes a D/A converter for processing said selected amplitude to form said dither drive signal with correct amplitude, and an amplifier for generating and amplifying said dither drive signal to said angular rate detecting unit based on said dither drive signal with said selected frequency and correct amplitude.

35. The angular rate producer, as recited in claim 27, wherein said digital processing system further includes a D/A converter for processing said selected amplitude to form said dither drive signal with correct amplitude, and an amplifier for generating and amplifying said dither drive signal to said angular rate detecting unit based on said dither drive signal with said selected frequency and correct amplitude.

36. The angular rate producer, as recited in claim 28, wherein said digital processing system further includes a D/A converter for processing said selected amplitude to form said dither drive signal with correct amplitude, and an amplifier for generating and amplifying said dither drive signal to said angular rate detecting unit based on said dither drive signal with said selected frequency and correct amplitude.

37. The angular rate producer, as recited in claim 30, wherein said digital processing system further includes a D/A converter for processing said selected amplitude to form said dither drive signal with correct amplitude, and an amplifier for generating and amplifying said dither drive signal to said angular rate detecting unit based on said dither drive signal with said selected frequency and correct amplitude.

38. The angular rate producer, as recited in claim 31, wherein said digital processing system further includes a D/A converter for processing said selected amplitude to form said dither drive signal with correct amplitude, and an amplifier for generating and amplifying said dither drive signal to said angular rate detecting unit based on said dither drive signal with said selected frequency and correct amplitude.

39. The angular rate producer, as recited in claim 32, wherein said digital processing system further includes a D/A converter for processing said selected amplitude to form said dither drive signal with correct amplitude, and an amplifier for generating and amplifying said dither drive signal to said angular rate detecting unit based on said dither drive signal with said selected frequency and correct amplitude.

40. The angular rate producer, as recited in claim 13, wherein said angle rate signal loop circuitry further comprises:

an amplifier and summer circuit, which is connected to a torque amplifier of said vibrating type angular rate detecting unit, for amplifying said torque signals and enhancing said sensitivity for more than ten times;

a high-pass filter circuit, which is connected to said amplifier and summer circuit, for removing residual drive signals and noise from said torque signal to form a filtered torque drive differential signal;

a demodulator circuit, which is connected to said high-pass filter circuit, for receiving said carrier reference signals as phase reference signals from said oscillator and said filtered torque drive differential signal from said high-pass filter circuit, and extracting said in-phase portion of said filtered torque drive differential signal to produce an inertial element rotation rate signal with known phase; and a low-pass filter, which is connected to said demodulator circuit, for removing high frequency noise from said inertial element rotation signal input thereto to form a low frequency inertial element rotation signal as output angular rate signals.

41. The angular rate producer, as recited in claim 14, wherein said angle rate signal loop circuitry firer comprises:

an amplifier and summer circuit, which is connected to a torque amplifier of said vibrating type angular rate detecting unit, for amplifying said torque signals and enhancing said sensitivity for more than ten times;

a high-pass filter circuit, which is connected to said amplifier and summer circuit, for removing residual drive signals and noise from said torque signal to form a filtered torque drive differential signal;

a demodulator circuit, which is connected to said high-pass filter circuit, for receiving said carrier reference signals as phase reference signals from said oscillator and said filtered torque drive differential signal from said high-pass filter circuit, and extracting said in-phase portion of said filtered torque drive differential signal to produce an inertial element rotation rate signal with known phase; and a low-pass filter, which is connected to said demodulator circuit, for removing high frequency noise from said inertial element rotation signal input thereto to form a low frequency inertial element rotation signal as output angular rate signals.

42. The angular rate producer, as recited in claim 19, wherein said angle rate signal loop circuitry further comprises:

an amplifier and summer circuit, which is connected to a torque amplifier of said vibrating type angular rate detecting unit, for amplifying said torque signals and enhancing said sensitivity for more than ten times;

a high-pass filter circuit, which is connected to said amplifier and summer circuit, for removing residual drive signals and noise from said torque signal to form a filtered torque drive differential signal;

a demodulator circuit, which is connected to said high-pass filter circuit, for receiving said carrier reference signals as phase reference signals from said oscillator and said filtered torque drive differential signal from said high-pass filter circuit, and extracting said in-phase portion of said filtered torque drive differential signal to produce an inertial element rotation rate signal with known phase; and a low-pass filter, which is connected to said demodulator circuit, for removing high frequency noise from said inertial element rotation signal input thereto to form a low frequency inertial element rotation signal as output angular rate signals.

43. The angular rate producer, as recited in claim 20, wherein said angle rate signal loop circuitry further comprises:

an amplifier and summer circuit, which is connected to a torque amplifier of said vibrating type angular rate detecting unit, for amplifying said torque signals and enhancing said sensitivity for more than ten times;

a high-pass filter circuit, which is connected to said amplifier and summer circuit, for removing residual drive signals and noise from said torque signal to form a filtered torque drive differential signal;

a demodulator circuit, which is connected to said high-pass filter circuit, for receiving said carrier reference signals as phase reference signals from said oscillator and said filtered torque drive differential signal from said high-pass filter circuit, and extracting said in-phase portion of said filtered torque drive differential signal to produce an inertial element rotation rate signal with known phase; and a low-pass filter, which is connected to said demodulator circuit, for removing high frequency noise from said inertial element rotation signal input thereto to form a low frequency inertial element rotation signal as output angular rate signals.

44. The angular rate producer, as recited in claim 23, wherein said angle rate signal loop circuitry further comprises:

an amplifier and summer circuit, which is connected to a torque amplifier of said vibrating type angular rate detecting unit, for amplifying said torque signals and enhancing said sensitivity for more than ten times;

a high-pass filter circuit, which is connected to said amplifier and summer circuit, for removing residual drive signals and noise from said torque signal to form a filtered torque drive differential signal;

a demodulator circuit, which is connected to said high-pass filter circuit, for receiving said carrier reference signals as phase reference signals from said oscillator and said filtered torque drive differential signal from said high-pass filter circuit, and extracting said in-phase portion of said filtered torque drive differential signal to produce an inertial element rotation rate signal with known phase; and a low-pass filter, which is connected to said demodulator circuit, for removing high frequency noise from said inertial element rotation signal input thereto to form a low frequency inertial element rotation signal as output angular rate signals.

45. The angular rate producer, as recited in claim 28, wherein said angle rate signal loop circuitry further comprises:

an amplifier and summer circuit, which is connected to a torque amplifier of said vibrating type angular rate detecting unit, for amplifying said torque signals and enhancing said sensitivity for more than ten times;

a high-pass filter circuit, which is connected to said amplifier and summer circuit, for removing residual drive signals and noise from said torque signal to form a filtered torque drive differential signal;

a demodulator circuit, which is connected to said high-pass filter circuit, for receiving said carrier reference signals as phase reference signals from said oscillator and said filtered torque drive differential signal from said high-pass filter circuit, and extracting said in-phase portion of said filtered torque drive differential signal to produce an inertial element rotation rate signal with known phase; and a low-pass filter, which is connected to said demodulator circuit, for removing high frequency noise from said inertial element rotation signal input thereto to form a low frequency inertial element rotation signal as output angular rate signals.

46. The angular rate producer, as recited in claim 32, wherein said angle rate signal loop circuitry further comprises:

an amplifier and summer circuit, which is connected to a torque amplifier of said vibrating type angular rate detecting unit, for amplifying said torque signals and enhancing said sensitivity for more than ten times;

a high-pass filter circuit, which is connected to said amplifier and summer circuit, for removing residual drive signals and noise from said torque signal to form a filtered torque drive differential signal;

a demodulator circuit, which is connected to said high-pass filter circuit, for receiving said carrier reference signals as phase reference signals from said oscillator and said filtered torque drive differential signal from said high-pass filter circuit, and extracting said in-phase portion of said filtered torque drive differential signal to produce an inertial element rotation rate signal with known phase; and a low-pass filter, which is connected to said demodulator circuit, for removing high frequency noise from said inertial element rotation signal input thereto to form a low frequency inertial element rotation signal as output angular rate signals.

47. The angular rate producer, as recited in claim 36, wherein said angle rate signal loop circuitry further comprises:

an amplifier and summer circuit, which is connected to a torque amplifier of said vibrating type angular rate detecting unit, for amplifying said torque signals and enhancing said sensitivity for more than ten times;

a high-pass filter circuit, which is connected to said amplifier and summer circuit, for removing residual drive signals and noise from said torque signal to form a filtered torque drive differential signal;

a demodulator circuit, which is connected to said high-pass filter circuit, for receiving said carrier reference signals as phase reference signals from said oscillator and said filtered torque drive differential signal from said high-pass filter circuit, and extracting said in-phase portion of said filtered torque drive differential signal to produce an inertial element rotation rate signal with known phase; and a low-pass filter, which is connected to said demodulator circuit, for removing high frequency noise from said inertial element rotation signal input thereto to form a low frequency inertial element rotation signal as output angular rate signals.

48. The angular rate producer, as recited in claim 39, wherein said angle rate signal loop circuitry further comprises:

an amplifier and summer circuit, which is connected to a torque amplifier of said vibrating type angular rate detecting unit, for amplifying said torque signals and enhancing said sensitivity for more than ten times;

a high-pass filter circuit, which is connected to said amplifier and summer circuit, for removing residual drive signals and noise from said torque signal to form a filtered torque drive differential signal;

a demodulator circuit, which is connected to said high-pass filter circuit, for receiving said carrier reference signals as phase reference signals from said oscillator and said filtered torque drive differential signal from said high-pass filter circuit, and extracting said in-phase portion of said filtered torque drive differential signal to produce an inertial element rotation rate signal with known phase; and a low-pass filter, which is connected to said demodulator circuit, for removing high frequency noise from said inertial element rotation signal input thereto to form a low frequency inertial element rotation signal as output angular rate signals.

49. An angular rate producing process for measuring a vehicle angular rate, comprising the steps of:

(a) receiving dither drive signal to maintain an oscillation of at least one set of inertial elements in an angular rate detecting unit with constant momentum, and producing angular motion-induced signals with respect to said vehicle angular rate and inertial element dither motion signals;

(b) converting said angular motion-induced signals from said angular rate detecting unit in an interfacing circuitry into consistent and repeatable angular rate signals that are proportional to said vehicle angular rate, and converting said inertial element dither motion signals from said angular rate detecting unit in said interfacing circuitry into digital element displacement signals with predetermined phase; and (c) inputting said digital element displacement signals into a digital processing system and producing said dither drive signal for locking high-quality factor frequency and amplitude of said oscillating inertial elements in said angular rate detecting unit.

50. The angular rate producing process, as recited in claim 49, wherein said angular rate detecting unit is a vibrating type angular rate detecting unit for detecting vehicle angular motions through Corilois Effect and outputting said angular motion-induced signals which are voltage proportional to angular rate and torque signals.

51. The angular rate producer, as recited in claim 50, wherein said step (c) comprises the steps of:

(c-1) receiving said digital inertial element displacement signals with known phase from said interfacing circuitry for finding frequencies which have highest Quality Factor (Q) Values, (c-2) locking said frequencies, and (c-3) locking an amplitude to produce said dither drive signal, including high frequency sinusoidal signals with a precise amplitude, to said angular rate detecting unit to keep said inertial elements oscillating at a predetermined resonant frequency.

52. The angular rate producer, as recited in claim 50, wherein said step (b) comprises the steps of:

(b-1) providing reference pickoff signals by an oscillator;

(b-2) receiving said inertial element dither motion signals from said vibrating type angular rate detecting unit and said reference pickoff signals from said oscillator in a dither motion control circuitry and producing said digital inertial element displacement signals with known phase; and (b-3) receiving said angular motion-induced signals from said vibrating type angular rate detecting unit and said reference pickoff signals from said oscillator in an angle signal loop circuitry, and transforming said angular motion-induced signals into said angular rate signals.

53. The angular rate producer, as recited in claim 51, wherein said step (b) comprises the steps of:

(b-1) providing reference pickoff signals by an oscillator;

(b-2) receiving said inertial element dither motion signals from said vibrating type angular rate detecting unit and said reference pickoff signals from said oscillator in a dither motion control circuitry and producing said digital inertial element displacement signals with known phase; and (b-3) receiving said angular motion-induced signals from said vibrating type angular rate detecting unit and said reference pickoff signals from said oscillator in an angle signal loop circuitry, and transforming said angular motion-induced signals into said angular rate signals.

54. The angular rate producer, as recited in claim 53, wherein said steps (b-3) further comprises the steps of:

(b-3-1) receiving said angular motion-induced signals by a high-pass filter circuit connected to said vibrating type angular rate detecting unit and removing low frequency noise of said angular motion-induced signals, which are AC voltage signals output from vibrating type angular rate detecting unit, to form filtered angular motion-induced signals;

(b-3-2) amplifying said filtered angular motion-induced signals by a voltage amplifier circuit to an extent of at least 100 milivolts to form amplified angular motion-induced signals;

(b-3-3) subtracting a difference between said angle rates of said amplified angular motion-induced signals in an amplifier and summer circuit to produce a differential angle rate signal;

(b-3-4) extracting an amplitude of said in-phase differential angle rate signal from said differential angle rate signal and said capacitive pickoff excitation signals from said oscillator in a demodulator which is connected to said amplifier and summer circuit; and (b-3-5) removing a high frequency noise of said amplitude signal of said in-phase differential angle rate signal in a low-pass filter connected to said demodulator to form said angular rate signal output.

55. The angular rate producer, as recited in claim 54, wherein said step (b-3) further comprises the steps of:

(b-3-6) integrating said angular rate signal by an integrator connected with said low-pass filter to form a displacement restoring signal, and (b-3-7) amplifying said displacement restoring signal by a driver amplifier connected to said integrator to form a driving signal, including a re-torque signal, to said vibrating type angular rate detecting unit to maintain said inertial elements of said vibrating type angular rate detecting unit without offset.

56. The angular rate producing process, as recited in claim 53, wherein said step (b-2) further comprises the steps of:

(b-2-1) changing said output impedance of said dither motion signals from a very high level, greater than 100 million ohms, to a low level, less than 100 ohms to achieve two dither displacement signals, which are A/C voltage signals representing said displacement between said inertial elements and said anchor combs;

(b-2-2) amplifying said two dither displacement signals for more than ten times and enhancing said sensitivity for combining said two dither displacement signals to achieve a dither displacement differential signal by subtracting a center anchor comb signal with a side anchor comb signal;

(b-2-3) removing residual dither drive signal and noise from said dither displacement differential signal to form a filtered dither displacement differential signal;

(b-2-4) receiving said capacitive pickoff excitation signals as phase reference signals from said oscillator and said filtered dither displacement differential signal and extracting said in-phase portion of said filtered dither displacement differential signal to produce an inertial element displacement signal with known phase;

(b-2-5) removing high frequency noise from said inertial element displacement signal to form a low frequency inertial element displacement signal; and (b-2-6) converting said low frequency inertial element displacement signal that is an analog signal to produce a digitized low frequency inertial element displacement signal.

57. The angular rate producing process, as recited in claim 54, wherein said step (b-2) further comprises the steps of:

(b-2-1) changing said output impedance of said dither motion signals from a very high level, greater than 100 million ohms, to a low level, less than 100 ohms to achieve two dither displacement signals, which are A/C voltage signals representing said displacement between said inertial elements and said anchor combs;

(b-2-2) amplifying said two dither displacement signals for more than ten times and enhancing said sensitivity for combining said two dither displacement signals to achieve a dither displacement differential signal by subtracting a center anchor comb signal with a side anchor comb signal;

(b-2-3) removing residual dither drive signal and noise from said dither displacement differential signal to form a filtered dither displacement differential signal;

(b-2-4) receiving said capacitive pickoff excitation signals as phase reference signals from said oscillator and said filtered dither displacement differential signal and extracting said in-phase portion of said filtered dither displacement differential signal to produce an inertial element displacement signal with known phase;

(b-2-5) removing high frequency noise from said inertial element displacement signal to form a low frequency inertial element displacement signal; and (b-2-6) converting said low frequency inertial element displacement signal that is an analog signal to produce a digitized low frequency inertial element displacement signal.

58. The angular rate producing process, as recited in claim 55, wherein said step (b-2) further comprises the steps of:

(b-2-1) changing said output impedance of said dither motion signals from a very high level, greater than 100 million ohms, to a low level, less than 100 ohms to achieve two dither displacement signals, which are A/C voltage signals representing said displacement between said inertial elements and said anchor combs;

(b-2-2) amplifying said two dither displacement signals for more than ten times and enhancing said sensitivity for combining said two dither displacement signals to achieve a dither displacement differential signal by subtracting a center anchor comb signal with a side anchor comb signal;

(b-2-3) removing residual dither drive signal and noise from said dither displacement differential signal to form a filtered dither displacement differential signal;

(b-2-4) receiving said capacitive pickoff excitation signals as phase reference signals from said oscillator and said filtered dither displacement differential signal and extracting said in-phase portion of said filtered dither displacement differential signal to produce an inertial element displacement signal with known phase;

(b-2-5) removing high frequency noise from said inertial element displacement signal to form a low frequency inertial element displacement signal; and (b-2-6) converting said low frequency inertial element displacement signal that is an analog signal to produce a digitized low frequency inertial element displacement signal.

59. The angular rate producing process, as recited in claim 58, wherein said digitized low frequency inertial element displacement signal is first represented in term of a spectral content thereof by using discrete Fast Fourier Transform (FFT), which is an efficient algorithm for computing discrete Fourier transform (DFT), which dramatically reduces said computation load imposed by said DFT, which is used to approximate said Fourier transform of a discrete signal.

60. The angular rate producing process, as recited in claim 59, further comprising an additional step of controlling and stabilizing said selected frequency and amplitude.

61. The angular rate producing process, as recited in claim 50, wherein said step (c-1) further comprises the steps of:

(3-1-1) transforming said digitized low frequency inertial element displacement signal from said analog/digital converter of dither motion control circuitry to form amplitude data with said frequency spectrum of said input inertial element displacement signal;

(3-1-2) receiving said amplitude data with frequency spectrum to form an array of amplitude data with frequency spectrum;

(3-1-3) partitioning said frequency spectrum from said array of said amplitude data with frequency into plural spectrum segments, and choosing those frequencies with said largest amplitudes in said local segments of said frequency spectrum;

(3-1-4) performing Q analysis on said chosen frequencies to select frequency and amplitude by computing said ratio of amplitude/bandwidth, wherein said range for computing bandwidth is between +−½ of said peek for each maximum frequency point.

62. The angular rate producing process, as recited in claim 58, wherein said step (c-1) further comprises the steps of:

(3-1-1) transforming said digitized low frequency inertial element displacement signal from said analog/digital converter of dither motion control circuitry to form amplitude data with said frequency spectrum of said input inertial element displacement signal;

(3-1-2) receiving said amplitude data with frequency spectrum to form an array of amplitude data with frequency spectrum;

(3-1-3) partitioning said frequency spectrum from said array of said amplitude data with frequency into plural spectrum segments, and choosing those frequencies with said largest amplitudes in said local segments of said frequency spectrum;

(3-1-4) performing Q analysis on said chosen frequencies to select frequency and amplitude by computing said ratio of amplitude/bandwidth, wherein said range for computing bandwidth is between +−½ of said peek for each maximum frequency point.

63. The angular rate producing process, as recited in claim 61, wherein said step (3-2) further comprises the steps of (3-2-1) rejecting noise of said selected frequency to form a dither drive signal with said selected frequency by, which serves as a very narrow bandpass filter.

64. The angular rate producing process, as recited in claim 62, wherein said step (3-2) further comprises the steps of (3-2-1) rejecting noise of said selected frequency to form a dither drive signal with said selected frequency by, which serves as a very narrow bandpass filter.

65. The angular rate producing process, as recited in claim 61, wherein said step (3-2) further comprises the steps of processing said selected amplitude to form said dither drive signal with correct amplitude, and generating and amplifying said dither drive signal to said angular rate detecting unit based on said dither drive signal with said selected frequency and correct amplitude.

66. The angular rate producing process, as recited in claim 62, wherein said step (3-2) further comprises the steps of processing said selected amplitude to form said dither drive signal with correct amplitude, and generating and amplifying said dither drive signal to said angular rate detecting unit based on said dither drive signal with said selected frequency and correct amplitude.

67. The angular rate producing process, as recited in claim 63, wherein said step (3-2) further comprises the steps of processing said selected amplitude to form said dither drive signal with correct amplitude, and generating and amplifying said dither drive signal to said angular rate detecting unit based on said dither drive signal with said selected frequency and correct amplitude.

68. The angular rate producing process, as recited in claim 64, wherein said step (3-2) further comprises the steps of processing said selected amplitude to form said dither drive signal with correct amplitude, and generating and amplifying said dither drive signal to said angular rate detecting unit based on said dither drive signal with said selected frequency and correct amplitude.

69. The angular rate producing process, as recited in any of the claims 56 to 68, wherein said step (2-2) further comprises the steps of:

(b-2-7) amplifying said torque signals and enhancing said sensitivity for more than ten times;

(b-2-8) removing residual drive signals and noise from said torque signal to form a filtered torque drive differential signal;

(b-2-9) receiving said carrier reference signals as phase reference signals from said oscillator and said filtered torque drive differential signal, and extracting said in-phase portion of said filtered torque drive differential signal to produce an inertial element rotation rate signal with known phase; and (b-2-10) removing high frequency noise from said inertial element rotation signal to form a low frequency inertial element rotation signal as output angular rate signals.

* * * * *